(12) United States Patent
Pandit et al.

(10) Patent No.: US 11,248,930 B2
(45) Date of Patent: Feb. 15, 2022

(54) MICROCLIMATE WIND FORECASTING

(71) Applicant: International Business Machines Corporation, Armonk, NY (US)

(72) Inventors: Sushain Pandit, Austin, TX (US); Fang Wang, Westford, MA (US); Su Liu, Austin, TX (US); Cheng Xu, Beijing (CN)

(73) Assignee: International Business Machines Corporation, Armonk, NY (US)

( * ) Notice: Subject to any disclaimer, the term of this patent is extended or adjusted under 35 U.S.C. 154(b) by 963 days.

(21) Appl. No.: 15/910,602

(22) Filed: Mar. 2, 2018

(65) Prior Publication Data

US 2019/0271563 A1    Sep. 5, 2019

(51) Int. Cl.
| | | |
|---|---|---|
| *G01C 23/00* | (2006.01) | |
| *G01W 1/02* | (2006.01) | |
| *G01W 1/10* | (2006.01) | |
| *G06F 16/22* | (2019.01) | |
| *B64C 27/04* | (2006.01) | |
| *B64C 39/02* | (2006.01) | |
| *G01W 1/00* | (2006.01) | |
| *G06F 16/906* | (2019.01) | |

(52) U.S. Cl.
CPC ............. *G01C 23/005* (2013.01); *G01W 1/02* (2013.01); *G01W 1/10* (2013.01); *G06F 16/22* (2019.01); *B64C 27/04* (2013.01); *B64C 39/024* (2013.01); *B64C 2201/141* (2013.01); *B64C 2201/146* (2013.01); *G01W 2001/003* (2013.01); *G01W 2001/006* (2013.01)

(58) Field of Classification Search
CPC ................ G05D 1/0005; B64C 39/024; B64C 2201/141; B64C 2201/143; B64C 2201/145; B64C 2201/146; B64C 2201/148; B64C 27/04; B64C 2201/122; B64C 2201/125; B64C 2201/127; G01C 23/005; G01C 21/20; G01W 1/02; G01W 1/10; G01W 2001/003; G01W 2001/006; G06F 16/22; G06F 16/906; G06F 16/909; B64D 45/00

See application file for complete search history.

(56) References Cited

U.S. PATENT DOCUMENTS

| | | | | |
|---|---|---|---|---|
| 6,856,894 B1 * | 2/2005 | Bodin | ................. | G05D 1/0044 244/75.1 |
| 8,521,339 B2 * | 8/2013 | Gariepy | ............... | G05D 1/0094 701/2 |

(Continued)

OTHER PUBLICATIONS

"Flowaround Buildings", Flow Design, Autodesk.Help, Feb. 11, 2015, ©Copyright2017 Autodesk Inc., 12 pages,<https://knowledge.autodesk.com/support/flow-design/learn-explore/caas/CloudHelp/cloudhelp/ENU/FlowDesign/files/GUID-3B35931F-AB23-45E9-BFCA-2E578D26BF3A-htm.html>.*

(Continued)

*Primary Examiner* — Frederick M Brushaber
(74) *Attorney, Agent, or Firm* — Stosch Sabo

(57) ABSTRACT

A wind forecasting system configured to generate forecasted wind conditions for a time interval based on wind data derived from flight log data collected from a plurality of aerial vehicles operating in a first area. The forecasted wind conditions can be used by an aerial route management system to generate a flight plan for an aerial vehicle from a start location to an end location in the first area during the time interval.

20 Claims, 11 Drawing Sheets

(56) References Cited

U.S. PATENT DOCUMENTS

| | | | | |
|---|---|---|---|---|
| 8,880,326 | B1* | 11/2014 | Bonawitz | G06Q 10/047 |
| | | | | 701/120 |
| 9,031,719 | B2* | 5/2015 | Hall | G05D 1/0204 |
| | | | | 701/7 |
| 10,023,298 | B1* | 7/2018 | Beckman | B64C 39/024 |
| 10,776,744 | B1* | 9/2020 | Kimchi | G06F 30/20 |
| 2011/0295569 | A1* | 12/2011 | Hamke | G01P 5/00 |
| | | | | 703/2 |
| 2014/0046510 | A1* | 2/2014 | Randolph | G01P 13/045 |
| | | | | 701/14 |
| 2014/0316616 | A1* | 10/2014 | Kugelmass | G06T 11/206 |
| | | | | 701/8 |
| 2015/0016690 | A1* | 1/2015 | Freeman | G06T 7/246 |
| | | | | 382/107 |
| 2016/0273879 | A1* | 9/2016 | Volfson | G01S 19/13 |
| 2017/0004345 | A1* | 1/2017 | Sasaki | G06T 7/73 |
| 2017/0069214 | A1* | 3/2017 | Dupray | G08G 5/0013 |
| 2017/0102241 | A1* | 4/2017 | Paduano | G01S 15/42 |
| 2018/0061251 | A1* | 3/2018 | Venkatraman | B64C 39/02 |
| 2018/0164866 | A1* | 6/2018 | Turakhia | G06N 3/063 |
| 2018/0166920 | A1* | 6/2018 | Britz | H02J 50/12 |
| 2018/0225116 | A1* | 8/2018 | Henry | G06F 9/30076 |
| 2018/0292817 | A1* | 10/2018 | Yang | B64C 39/024 |
| 2019/0147753 | A1* | 5/2019 | Hendrian | G05D 1/104 |
| | | | | 701/14 |

OTHER PUBLICATIONS

"Hodograph", From Wikipedia, This page was last edited on Nov. 5, 2017, 3 pages, <https://en.wikipedia.org/wiki/Hodograph>.*

"IBM Intelligent Video Analytics", Last printed Dec. 7, 2017, 1 page, <https://www.ibm.com/us-en/marketplace/video-analytics-for-security>.*

"IBM Watson to Power SoftBank Robotiics1 Pepper", IBM News room, Las Vegas—Jan. 6, 2016, 2 pages, <https://www-03.ibm.com/press/us/en/pressrelease/48763.wss>.*

"Instrumented drone measurements help wind farmers site turbines to achieve greater efficiency", ScienceDaily, Nov. 21, 2016, 2 pages, <https://www.sciencedaily.com/releases/2016/11/161121090726.htm>.*

"Large eddy simulation", From Wikipedia, This page was last edited on Oct. 25, 2017, 10 pages, <https://en.wikipedia.org/w/index.php?title=Largeeddysimulation&oldid=807083401>.*

"Planetary boundary layer", From Wikipedia, This page was last edited on May 14, 2017, 5 pages, <https://en.wikipedia.org/w/index.php?title=Planetaryboundarylayer&oldid=780353862>.*

"Urban Microclimate", educate, Last printed Dec. 7, 2017, 1 page, <https://www.educate-sustainability.eu/kb/content/urban-microclimate>.*

"System and Method for Real Time Wind Farm Optimization with Aerial Drone(s)", An IP.com Prior Art Database Technical Disclosure, Disclosed Anonymously, IP.com No. IPCOM000250082D, IP.com Electronic Publication Date: May 30, 2017, 8 pages.*

Barton, Jeffrey D., "Fundamentals of Small Unmanned Aircraft Flight." Johns Hopkins APL Technical Digest, vol. 31, No. 2(2012), pp. 132-149.*

Biradar, Anandrao Shesherao, "Wind Estimation and Effects of Wind on Waypoint Navigation of UAVs." Masters Thesis, Arizona State University, May 2014, 68 pages, <https://repository.asu.edu/attachments/135075/content/Biradarasu_0010N_13909.pdf>.*

Cho, et al., "Wind Estimation and Airspeed Calibration using a UAV with a Single-Antenna GPS Receiver and Pitot Tube,"IEEE Transactions on Aerospace and Electronic Systems vol. 47, No. Jan. 1, 2011, pp. 109-117.*

CPP Wind Engineering & Air Quality Experts, CPP, 6 pages, printed Dec. 7, 2017, Copyright 1998-2015 CPP Inc., <https://www.cppwind.com/>.*

Ferranti, Marc, "IBM's Watson IoT hits the skies with Aerialtronics drone deal", PC Word, Sep. 17, 2016, 3 pages, <https://www.pcworld.com/article/3120503/ibms-watson-iot-hits-the-skies-with-aerialtronics-drone-deal.html>.*

Hansen, et al., "Diagnosis of airspeed measurement faults for unmanned aerial vehicles." IEEE Transactions on Aerospace and Electronic Systems, 50(1), 224-239, 2014, 15 pages.*

How et al., "Linear Flight Control Techniques for Unmanned Aerial Vehicles", Handbook of Unmanned Aerial Vehicles, © Springer Science+Business Media Dordrecht 2014, pp. 529-576.*

IBM Streams, "Streaming Analytics", IBM Cloud, Published Dec. 6, 2017, Sydney, United Kingdom, 1 page, <https://console.bluemix.net/catalog/services/streaming-analytics>.*

Ishihara, Tadashi, "Birds Eye View, New York City, Midtown Manhattan", 2000, David Rumsey Historical Map Collection, Copyright ©2017 Cartography Associates, 3 pages, <https://www.davidrumsey.com/luna/servet/detail/RUMSEY-8-1-272423-90046212:-Eve-View.-New-York-Citv.-Midt>.*

Johansen, et al., "On estimation of wind velocity, angle-of-attack and sideslip angle of small UAVs using standard sensors", 2015 International Conference on Unmanned Aircraft Systems (ICUAS), Denver, CO, USA, Jun. 9-12, 2015, pp. 510-519.*

Langelaan, et al., "Wind Field Estimation for Small Unmanned Aerial Vehicles", Journal of Guidance, Control, and Dynamics, vol. 34, No. 4, Jul.-Aug. 2011, pp. 1016-1030, <https://doi.org/1 0.2514/1.52532>.*

Mell et al., "The NIST Definition of Cloud Computing", National Institute of Standards and Technology, Special Publication 800-145, Sep. 2011, 7 pages.*

Moyano Cano, Javier, "Quadrotor UAV for wind profile characterization." Universidad Carlos III de Madrid2013, 86 pages, <http://hd.handle.net/10016/18105>.*

Olsen, C., "Synthetic Air Data (an afternoon hack)", Posted on Dec. 15, 2016, 5 pages, <http://gailinazo.flightgear.org/uas/synthetic-air-data-an-afternoon-hack/>.*

Pearson, Jordan, "We Stress-Tested Drones In a High-Tech Wind Vortex", MOTHERBOARD, May 10, 2016, 14 pages, <https://motherboard.vice.com/enus/article/aekkvb/we-stress-tested-drones-in-a-high-tech-wind-vortex>.*

Premerlani, William, "Wind estimation without an airspeed sensor", DIY Drones, Jan. 29, 2010, 2 pages, <http://diydrones.com/forum/topics/wind-estimation-without-an>.*

Putze, et al., "UAV Flight Analysis for Wind Measurement", May 9, 2014, 3 pages, <https://www.suasnews.com/2014/05/uav-flight-analysis-for-wind-measurement/>.*

Qu, et al., "Real-time Wind Vector Estimation for a Micro UAV", 2017 International Conference on Unmanned Aircraft Systems (ICUAS), Jun. 13-16, 2017, Miami, FL, USA, pp. 1716-1721.*

Schiano, et al., "Towards Estimation and Correction of Wind Effects on a Quadrotor UAV", IMAV 2014: International Micro Air Vehicle Conference and Competition 2014, pp. 134-141, <https://www.research-collection.ethz.ch/handle/20.500.11850/92099>.*

Xiang, et al., "Wind Field Estimation Through Autonomous Quadcopter Avionics", 2016 IEEE/AIAA 35th Digital Avionics Systems Conference (DASC), Sacramento, CA, Sep. 25-29, 2016, pp. 1-6.*

"IBM Watson to Power SoftBank Robotiics' Pepper", IBM News room, Las Vegas—Jan. 6, 2016, 2 pages, <https://www-03.ibm.com/press/us/en/pressrelease/48763.wss>.

Ishihara, Tadashi," Birds Eye View, New York City, Midtown Manhattan", 2000, David Rumsey Historical Map Collection, Copyright ©2017 Cartography Associates, 3 pages, <https://www.davidrumsey.com/luna/servlet/detail/ RUMSEY~8~1~272423~90046212:Birds-Eye-View,-New-York-City,-Midt>.

Moyano Cano, Javier, "Quadrotor UAV for wind profile characterization." Universidad Carlos III de Madrid2013, 86 pages, <http://hdl.handle.net/10016/18105>.

Olsen, C., "Synthetic Air Data (an afternoon hack)", Posted on Dec. 15, 2016, 5 pages, <http://gallinazo.flightgear.org/uas/synthetic-air-data-an-afternoon-hack/>.

* cited by examiner

MICROCLIMATE WIND FORECASTING

BACKGROUND

The present disclosure relates to weather forecasting, and, more specifically, to forecasting wind characteristics in urban microclimates.

SUMMARY

Aspects of the present disclosure are directed toward a computer-implemented method comprising collecting flight log data from a plurality of aerial vehicles and associated with a first area. The flight log data comprises at least speed data, orientation data, and location data. The method can further comprise generating a wind characteristics database for the first area based on the flight log data associated with the first area. The wind characteristics database comprises a plurality of wind speed data for respective locations in the first area based on the speed data, the orientation data, and the location data. The method can further comprise receiving a request for routing an aerial vehicle in the first area, the request including at least a start location, an end location, and a first time interval. The method can further comprise generating, based on data stored in the wind characteristics database, forecasted wind conditions for the first area during the first time interval. The method can further comprise generating, using the forecasted wind conditions, a plurality of routes between the start location and the end location in the first area, and providing a first route of the plurality of possible routes to the aerial vehicle.

Further aspects of the present disclosure are directed toward a system comprising a wind database storing wind data for an urban microclimate. The wind data is derived from flight log data collected from a plurality of unmanned aerial vehicles (UAVs) operating in the urban microclimate. The system can further comprise a wind forecasting system comprising a processor and a memory and communicatively coupled to the wind database. The wind forecasting system is configured to generate forecasted wind conditions for the urban microclimate for a first time interval. The forecasted wind conditions are based on the wind database and a weather forecast for the urban microclimate during the first time interval. The system can further comprise an aerial route management system comprising a processor and a memory and communicatively coupled to the wind forecasting system and a first UAV. The aerial route management system plans a first route for the first UAV from a start location to an end location in the urban microclimate. The first route is based on the forecasted wind conditions.

Further aspects of the present disclosure are directed to a computer program product comprising a computer readable storage medium having program instructions embodied therewith. The computer readable storage medium is not a transitory signal per se. The program instructions are executable by a processor to cause the processor to perform a method comprising collecting flight log data from a plurality of aerial vehicles and associated with a first area. The flight log data comprises at least speed data, orientation data, and location data. The method can further comprise generating a wind characteristics database for the first area based on the flight log data associated with the first area. The wind characteristics database comprises a plurality of wind speed data for respective locations in the first area based on the speed data, the orientation data, and the location data. The method can further comprise receiving a request for routing an aerial vehicle in the first area, the request including at least a start location, an end location, and a first time interval. The method can further comprise generating, based on data stored in the wind characteristics database, forecasted wind conditions for the first area during the first time interval. The method can further comprise generating, using the forecasted wind conditions, a plurality of routes between the start location and the end location in the first area, and providing a first route of the plurality of possible routes to the aerial vehicle.

BRIEF DESCRIPTION OF THE DRAWINGS

The drawings included in the present application are incorporated into, and form part of, the specification. They illustrate embodiments of the present disclosure and, along with the description, serve to explain the principles of the disclosure. The drawings are only illustrative of certain embodiments and do not limit the disclosure.

Figure 1:
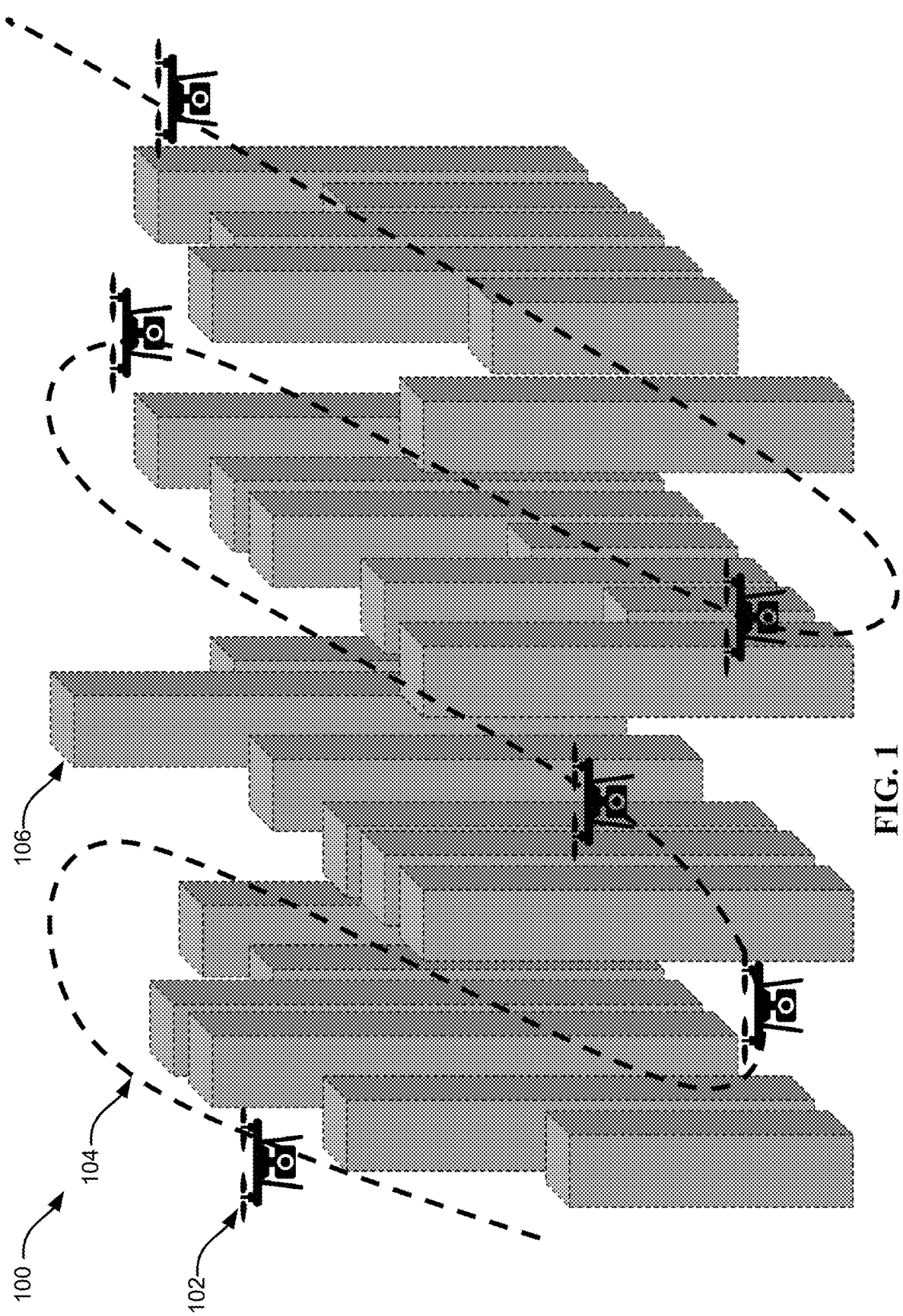
FIG. 1 illustrates an example aerial vehicle operating in and/or collecting data from an example urban microclimate in accordance with some embodiments of the present disclosure.

While the present disclosure is amenable to various modifications and alternative forms, specifics thereof have been shown by way of example in the drawings and will be described in detail. It should be understood, however, that the intention is not to limit the present disclosure to the particular embodiments described. On the contrary, the intention is to cover all modifications, equivalents, and alternatives falling within the spirit and scope of the present disclosure.

DETAILED DESCRIPTION

Aspects of the present disclosure are directed toward weather forecasting, and, more specifically, to forecasting wind characteristics (e.g., wind directions, wind speeds, wind altitude, time, season, temperature, location, etc.) in urban microclimates based on flight log data collected from a network of unmanned aerial vehicles (UAVs). Further aspects of the present disclosure are directed to generating expeditious, efficient, safe, and/or reliable flight plans for UAVs operating in urban microclimates based on forecasted wind characteristics for the urban microclimates.

An urban microclimate can comprise a specified area such as, for example, less than 500 square miles, less than 200 square miles, less than 50 square miles, or less than 1 square mile. In some embodiments, an urban microclimate can be an area having a population density above a threshold (e.g., greater than 1,000, 5,000, or 10,000 people per square mile). In some embodiments, an urban microclimate can be an area having a population above a threshold (e.g., more than 10,000 people, 100,000 people, etc.). In some embodiments, an urban microclimate can be an area having at least a plurality of man-made structures. Regardless of the size, population, or population density, an urban microclimate can be characterized by altered weather characteristics (e.g., wind patterns) as a result of man-made structures (e.g., buildings, skyscrapers, roads, freeways, overpasses, etc.).

Urban microclimates can cause complex wind patterns. As a first example, buildings can cause, contribute to, and/or exacerbate wind characteristics such as downdrafts (e.g., the downdraught effect), updrafts, vortices (e.g., vortex shedding), tunneling (e.g., the Venturi effect, also referred to as channeling), counter-current effects, eddies, pressure variations, and so on. As a second example, a street lined with large buildings may "funnel" wind and cause increased wind speeds (e.g., the Venturi effect). As a third example, a large building may "catch" wind gusts and force the wind upward and downward (e.g., the downdraught effect). Thus, urban microclimates can cause unique and complicated wind characteristics (e.g., varying wind speeds in varying directions for varying intervals).

For the purposes of the present disclosure, wind characteristics are characteristics related to speed, direction, variability, turbulence, and/or gusting of wind. In some embodiments, wind characteristics are also associated with weather characteristics (e.g., temperature, solar angle of incidence, barometric pressure, humidity, precipitation, and/or other weather data). In some embodiments, wind characteristics are also associated with time characteristics (e.g., time of day, season of year, etc.). Wind characteristics can be represented using vectors, matrices, or a combination of vectors and matrices. In some embodiments, wind characteristics are represented using Euclidean coordinates, polar coordinates, cylindrical coordinates, and/or spherical coordinates. Wind characteristics can be visually represented using, for example, a hodograph (e.g., a two-dimensional hodograph, a three-dimensional hodograph, etc.).

Complex wind patterns in urban microclimates can be dangerous to low-altitude aerial vehicles such as, but not limited to, UAVs (also referred to as drones) and helicopters. UAVs and helicopters are susceptible to urban microclimate wind anomalies because such aerial vehicles operate at low-altitudes (e.g., below 2,000 feet altitude, often below 400 feet altitude), low-speed (e.g., below 200 miles per hour, often below 50 miles per hour), and low weight (e.g., under 5,000 pounds, often under 25 pounds). As a result, unexpected and/or variable wind characteristics can have adverse safety, reliability, performance, and/or efficiency impacts on aerial vehicles. Thus, there is a need to measure and forecast wind characteristics in urban microclimates in order to realize safe, reliable, and efficient flight plans for UAVs and/or helicopters.

However, attempting to model wind patterns for urban microclimates is complicated and expensive. Some example modeling techniques rely on miniaturized models tested in a wind tunnel, theoretical computational modeling, and/or static instrumentation. Regarding miniaturized models, a miniaturized model of the urban microclimate can be developed and tested in a wind tunnel to model wind characteristics at various wind speeds and wind directions. However, such modeling does not account for weather effects (e.g., temperature, humidity, barometric pressure, precipitation, solar angle of incidence, etc.) and/or dynamic effects (e.g., location, time, season, traffic, construction of new structures, etc.). Furthermore, testing wind turbulence patterns using miniaturized models is expensive (e.g., the cost to design the model, manufacture the model, and test the model).

Regarding theoretical computational modeling, theoretical computational modeling is challenging for at least the reason that such modeling relies on fluid dynamics calculations associated with numerous assumptions that are rarely consistent with a complicated environment such as an urban microclimate. Furthermore, such modeling fails to account for, or accounts for only in a limited sense, weather effects (e.g., temperature, humidity, barometric pressure, precipitation, solar angle of incidence, etc.) and/or dynamic effects (e.g., traffic, construction of new structures, etc.).

Regarding static instrumentation, static instrumentation can comprise instrumenting numerous locations in an urban microclimate with wind/weather measurement instruments. However, such a strategy is expensive and impractical (e.g., an accurate model requires many data points, and the cost to install and maintain hundreds or thousands of dedicated wind instruments is not feasible).

Aspects of the present disclosure overcome the above challenges by deriving wind characteristics from UAV flight log data, learning associations between weather patterns and wind characteristics, and forecasting wind characteristics for selected time intervals and weather conditions. Further aspects of the present disclosure apply the forecasted wind characteristics by planning aerial routes for aerial vehicles operating in urban microclimates and achieving safety, reliability, efficiency, and/or speed goals. Thus, aspects of the present disclosure improve wind characteristic modeling for urban microclimates and thereby improve the safety, reliability, and efficiency of aerial vehicle flight paths in urban microclimates.

Aspects of the present disclosure realize numerous advantages. For example, aspects of the present disclosure can accurately forecast wind characteristics in complex urban microclimates based on data collected from a network of UAVs. As is understood by one skilled in the art, accurate wind forecasts for urban microclimates are important for weather forecasting (e.g., forecasting temperatures, etc.), pollution forecasting (e.g., modeling pollution distribution from factories, traffic, construction, demolition, etc.), and aerial flight routing (e.g., efficient, expeditious, safe, and/or reliable routing of UAVs operating in urban microclimates). Forecast wind characteristics can be more accurate because the forecasting can be based on measured data rather than modeled data. Thus, aspects of the present disclosure advantageously generate accurate wind forecasts for urban microclimates which can improve many applications including weather forecasting, pollution forecasting, and aerial route management.

As another example advantage, aspects of the present disclosure identify safe, reliable, efficient, and/or expeditious aerial routes for UAVs and/or helicopters using the accurate forecast wind characteristics discussed above. Thus, aspects of the present disclosure can reduce energy consumption, increase timeliness, and/or increase safety of UAVs by generating expeditious, efficient, safe, and/or reliable flight plans for UAVs operating in urban microclimates based on forecast wind characteristics for the urban microclimate.

As another example advantage, aspects of the present disclosure are cost-efficient. For example, the wind data can be collected from flight log data of UAVs functioning in the urban microclimate. The UAVs need not be dedicated to exclusively collecting wind data (e.g., UAVs instrumented and operated exclusively for the purpose of collecting wind data), rather, the UAVs can be used for any purpose (e.g., hobbyist, commercial, government, etc.) and the flight log data can be collected for use by aspects of the present disclosure. As a result, flight log data is collected from a variety of locations, routes, speeds, altitudes, and weather conditions. Thus, the data is robust (e.g., diverse, accurate, etc.) and inexpensive (e.g., data is derived from existing equipment operating for other primary purposes) compared to alternative solutions (e.g., wind tunnel testing, theoretical modeling, city-wide instrumentation, etc.).

The aforementioned advantages are example advantages, and embodiments of the present disclosure exist that can contain all, some, or none of the aforementioned advantages while remaining within the spirit and scope of the present disclosure.

Referring now to the figures, FIG. 1 illustrates an example aerial vehicle operating in and/or collecting data from an example urban microclimate 100 in accordance with some embodiments of the present disclosure. A UAV 102 can follow a route 104 between a variety of buildings 106. Some embodiments of the present disclosure collect flight log data from the UAV 102 and use it to characterize and predict wind characteristics in the urban microclimate 100. Some embodiments of the present disclosure use the predicted wind characteristics of the urban microclimate 100 to develop efficient, safe, expeditious, and/or more reliable routes 104 for UAVs 102.

Figure 2A:
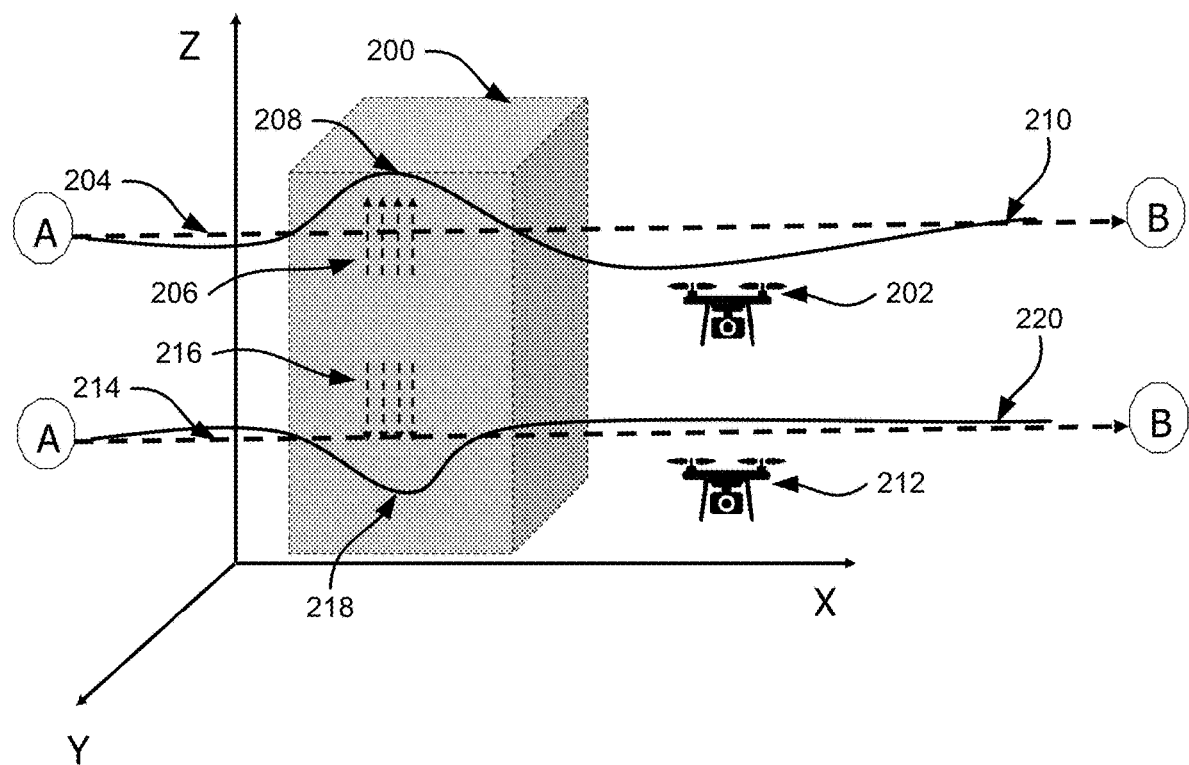
FIG. 2A illustrates an example wind anomaly in an urban microclimate in accordance with some embodiments of the present disclosure.

Referring now to FIG. 2A, illustrated is an example of a wind anomaly in an urban microclimate in accordance with some embodiments of the present disclosure. An urban microclimate can contain a building 200. A first UAV 202 following a first flight path 204 at a first altitude can experience an updraft 206 as a result of wind impacting the side of the building 200. The updraft 206 can change the path of the UAV 202 at 208. The UAV 202 can compensate for the updraft and return to the route 204 at 210.

Likewise, a second UAV 212 following a second flight path 214 can experience a downdraft 216 as a result of wind impacting the side of the building 200. The downdraft 216 can change the path of the UAV 212 at 218. The UAV 212 can compensate for the downdraft and return to the route 214 at 220.

Aspects of the present disclosure can collect the correction data (e.g., 208, 210, 218, and 220) from UAVs 202 and 212 to identify and predict wind characteristics. Aspects of the present disclosure use predicted wind characteristics to generate efficient, reliable, expeditious, and/or safe routes 204 and 214 for UAVs 202 and 212.

Figure 2B:
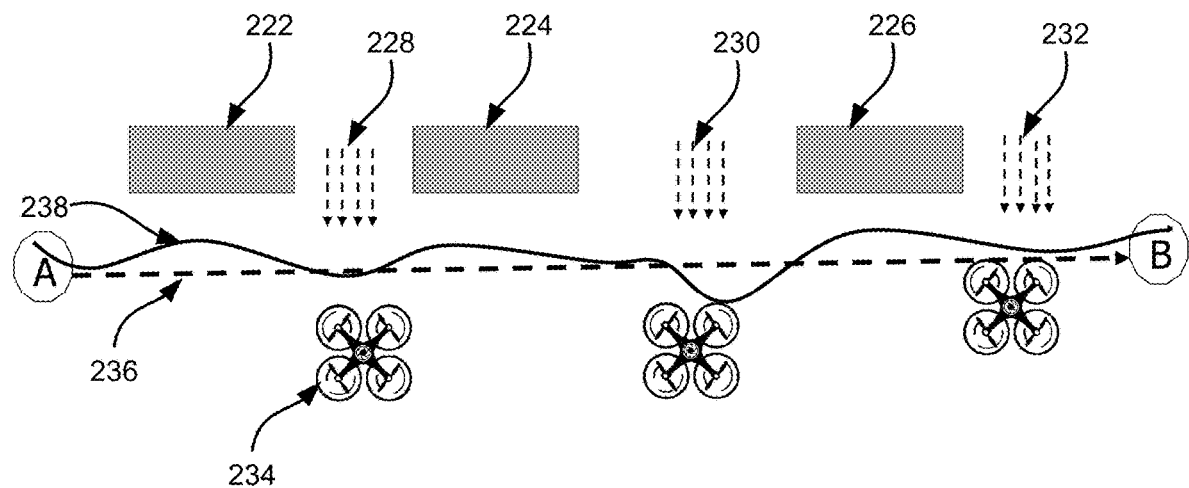
FIG. 2B illustrates another example wind anomaly in an urban microclimate in accordance with some embodiments of the present disclosure.

Referring now to FIG. 2B, illustrated is an example of another wind anomaly in an urban microclimate in accordance with some embodiments of the present disclosure. FIG. 2B presents a top (e.g., birds-eye) view of an urban microclimate. The urban microclimate can contain buildings 222, 224, and 226 (e.g., the tops of the buildings). The buildings can create wind channels 228, 230, and 232. A UAV 234 traversing a planned route 236 can be forced to follow a compensated route 238 accounting for the wind channels 228, 230, and 232.

Aspects of the present disclosure can collect data from the UAV 234 including the theoretical route 236 and the compensated route 238 to derive wind characteristics (e.g., wind channels 228, 230, and 232). Aspects of the present disclosure can use the collected data to forecast wind conditions in various urban microclimates in order to provide UAV 234 with a more efficient, reliable, faster, and/or safer route 236.

Figure 3:
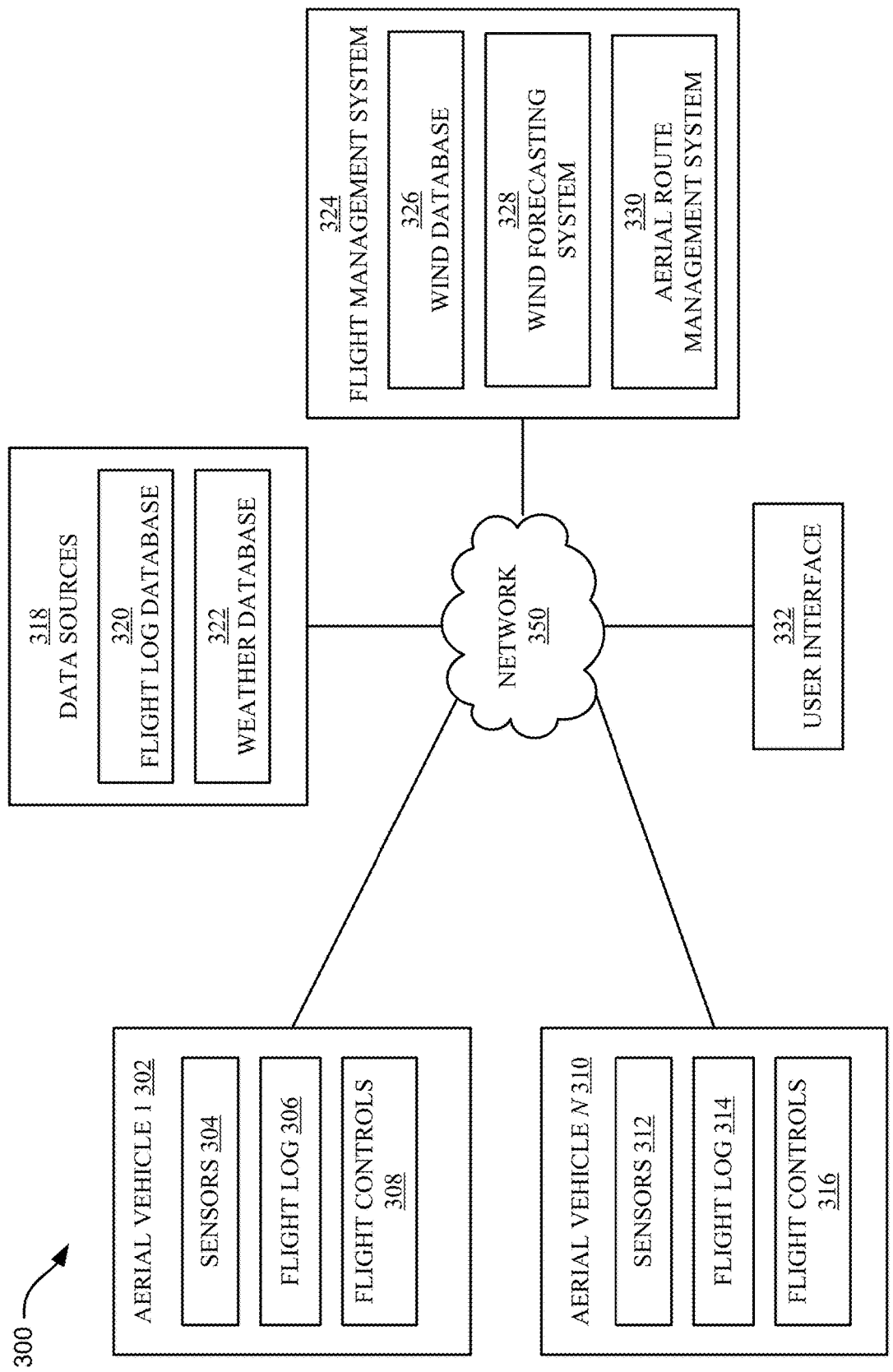
FIG. 3 illustrates a block diagram of an example network in accordance with some embodiments of the present disclosure.

Referring now to FIG. 3, illustrated is a block diagram of an example network 350 in accordance with some embodiments of the present disclosure. Network 350 can physically or virtually connect aerial vehicle 1 302, aerial vehicle N 310, data sources 318, flight management system 324, and user interface 332. In some embodiments, the network 350 connects the aforementioned components permanently, intermittently, and/or via one or more sub-networks.

Aerial vehicle 1 302 can include sensors 304, flight log 306, and flight controls 308. Aerial vehicle 1 302 can be, but is not limited to, a UAV, a drone, a helicopter (e.g., a single-rotor helicopter, a multi-rotor helicopter), a multi-rotor drone, a fixed-wing drone, a fixed-wing hybrid vertical takeoff and landing (VTOL) drone, or a different aerial vehicle. Aerial vehicle N 310 refers to any number of additional similar or dissimilar aerial vehicles, where N refers to a variable integer. For example, hundreds or thousands of aerial vehicles can be connected to network 350, simultaneously or at different times. Each aerial vehicle (similar or dissimilar) can contain sensors, a flight log, and flight controls, although these individual elements may not be identical between any two aerial vehicles. For example, sensors 312 can be consistent with (though not necessarily identical to) sensors 304. Likewise, flight log 314 can be consistent with (though not necessarily identical to) flight log 306. Likewise, flight controls 316 can be consistent with (though not necessarily identical to) flight controls 308.

Sensors 304 and 312 can be, but are not limited to, speed sensors, location sensors (e.g., global positioning systems (GPS)), acceleration sensors (e.g., accelerometers), wind sensors (e.g., wind speed, direction, gusts, turbulence, etc.), orientation sensors (e.g., gyroscopes, compasses), video sensors, audio sensors, temperature sensors, humidity sensors, barometric pressure sensors, power sensors (e.g., an amount of power sent to one or more rotors on a UAV), and/or other sensors.

Flight log 306 and 314 can collect and compile, for respective aerial vehicles, flight information such as, but not limited to, locations, altitudes, ground speeds, atmospheric speeds, directions, orientations, and so on. In some embodiments, flight log 306 and 314 can further comprise video data, audio data, efficiency data (e.g., expected remaining life, expected range, etc.), data regarding the type of aerial vehicle (size, model, configuration), payload information (e.g., type of payload, weight of payload, etc.), or other information.

Flight controls 308 and 316 can include manual flight control (e.g., remote pilot controls), automatic flight controls (e.g., receiving flight plan information and automatically flying the aerial vehicle according to the flight plan information), and/or tracking controls (e.g., for communicating position, speed, altitude, etc.).

Data sources 318 can retrieve data from aerial vehicles (e.g., aerial vehicles 302 and/or 310) and store the information in flight log database 320. In some embodiments, the flight log database 320 is a database managed by the Federal Aviation Administration (FAA) and contains flight path data of various UAV flights. In some embodiments, flight log database 320 includes additional data such as video data, and/or data regarding the aerial vehicle (e.g., efficiency, power, etc.). In some embodiments, flight log database 320 stores all or a portion of the information generated by sensors 304, 312 and/or flight logs 306, 314.

Data sources 318 further include weather database 322. Weather database 322 stores weather data (e.g., temperature, humidity, brightness, solar angle of incidence, wind, barometric pressure, precipitation, etc.). Weather database 322 can receive information from one or more aerial vehicles (e.g., aerial vehicles 302 and 310), from one or more weather stations, and/or from a different source (e.g., via the Internet). Data sources 318 can be communicatively coupled to flight management system 324.

Flight management system 324 can provide flight plan information to one or more aerial vehicles (e.g., aerial vehicles 302, 310) based on data sources 318. Flight management system 324 can include a wind database 326. Wind database 326 can store wind data based on information in flight log database 320. Wind database 326 can calculate wind speeds ($u_g$) and various times and locations based on at least a ground speed (u) and an atmospheric speed ($u_a$) according to Equation 1:

$$u_g = u - u_a \quad \text{Equation 1:}$$

In Equation 1, the terms $u_g$, u, and $u_a$ can be represented as vectors or matrices using Euclidean, polar, spherical, and/or cylindrical coordinates. In some embodiments, the above terms are derived from a speed reading and one or more orientation readings (e.g., yaw, pitch, roll, lateral, vertical, and/or longitudinal) from one or more instruments such as compasses and gyroscopes.

Thus, although wind data may not be directly collected in flight log database 320, wind characteristics can nonetheless be derived from the flight log data. For example, aerial vehicles can automatically account for wind gusts by modifying a direction of flight (e.g., by pointing somewhat into wind to maintain a flight path perpendicular to wind). Thus, the impacts of wind characteristics can be deduced based on modified directions of flight which are recorded in flight logs. In some embodiments, the modified directions of flight can be deduced from relative power provided to different rotors of a multi-rotor aerial vehicle.

Flight management system 324 can further comprise wind forecasting system 328. Wind forecasting system 328 can be configured to forecast wind characteristics in a given location and altitude for a known time in an urban microclimate using wind database 326. Wind forecasting system 328 can use, but is not limited to, machine learning algorithms and/or cognitive computing. Wind forecasting system 328 is discussed in more detail hereinafter with respect to FIG. 5.

Flight management system 324 can further comprise aerial route management system 330. Aerial route management system 330 can be configured to plan routes from a start location to an end location during a time interval and/or monitor aerial vehicles traversing a planned route. Aerial route management system 330 can plan routes to match one or more goals such as, but not limited to, efficiency, speed, safety, reliability or a different goal. For example, an efficiency goal may select a route associated with the lowest amount of battery usage (e.g., by traversing a longer route at a slower speed that advantageously uses wind to aid thrust, lift, and/or steering along the route). As another example, a speed goal may select a fastest route, even if that route is associated with safety risks (e.g., flying over open water). As another example, a safety goal may select a route with fewest obstacles (e.g., trees, buildings, power lines, traffic, construction, etc.). As another example, a reliability goal may select a well-known route. That is to say, a high reliability can be based on a route associated with a significant amount of data (or data that is relatively stable) relative to another route that may be associated with less data (or a same amount of data exhibiting greater variability). In some embodiments, reliability ratings are associated with confidence intervals.

Flight management system 324 can be communicatively coupled to user interface 332 via the network 350. User interface 332 can be configured to interact with flight management system 324, data sources 318, and/or one or more aerial vehicles 302, 310. For example, user interface 332 can be configured to remotely control aerial vehicle 1 302 using flight controls 308. User interface 332 can likewise be configured to request one or more routes from flight management system 324 by providing at least a start location, an end location, and a time interval. Likewise, user interface 332 can be configured to send data from flight log 306 to flight log database 320.

Although flight management system 324 is shown containing wind database 326, wind forecasting system 328, and aerial route management system 330, each of wind database 326, wind forecasting system 328, and aerial route management system 330 can be independent and communicatively coupled to one another via network 350.

FIG. 3 is intended to represent the major components of an example network according to embodiments of the present disclosure. In some embodiments, however, individual components can have greater or lesser complexity than shown in FIG. 3, and components other than, or in addition to those shown in FIG. 3 can be present. Furthermore, in some embodiments, various components illustrated in FIG. 3 can have greater, lesser, or different functionality than shown in FIG. 3.

Figure 4:
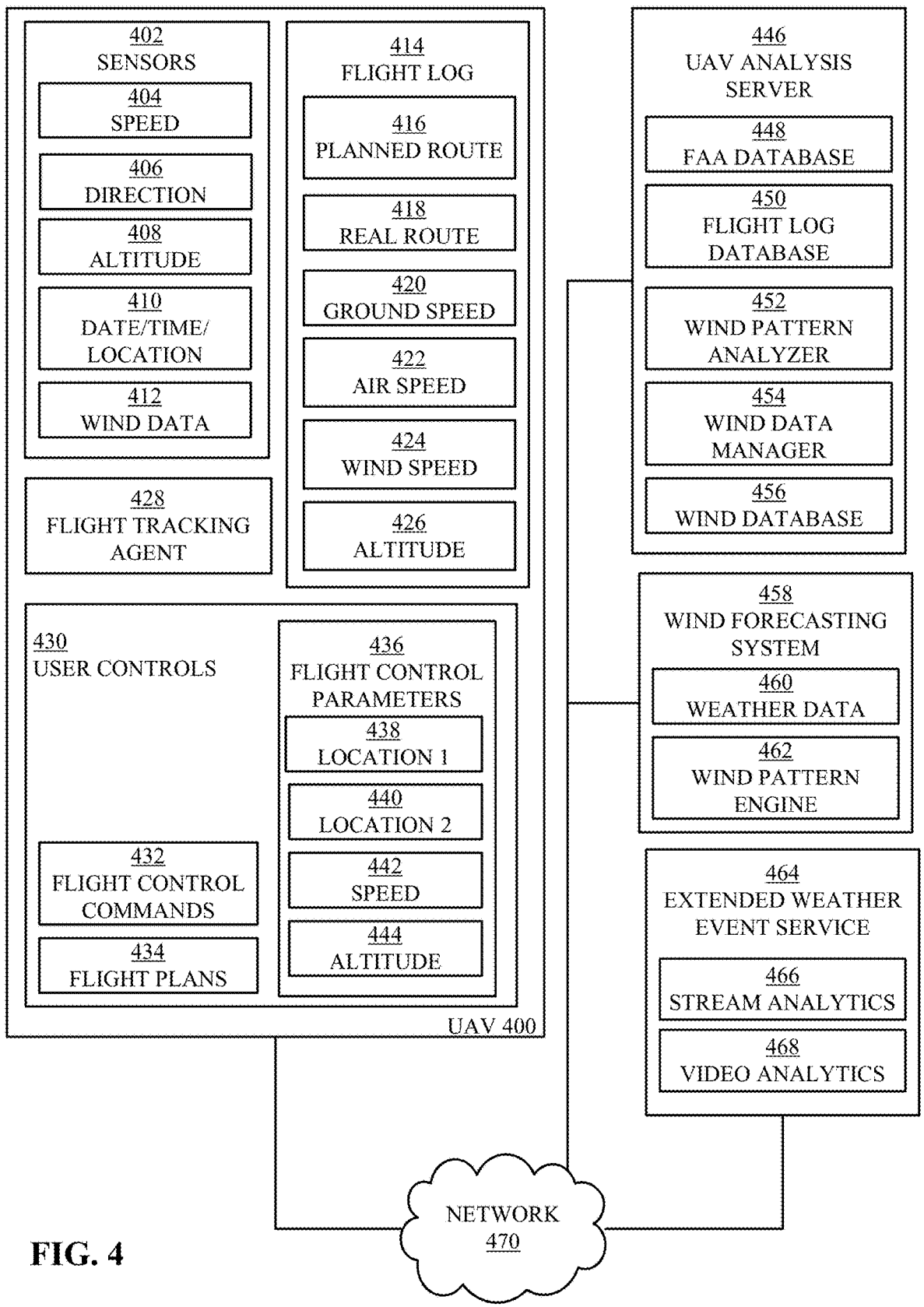
FIG. 4 illustrates a block diagram of another example network in accordance with some embodiments of the present disclosure.

Referring now to FIG. 4, illustrated is a block diagram of another example network in accordance with some embodiments of the present disclosure. In some embodiments, FIG. 4 illustrates more detailed embodiments than FIG. 3. UAV 400 can be consistent with aerial vehicles 302, 310 of FIG. 3. Although one UAV 400 is shown, embodiments exist that can contain tens, hundreds, or thousands of UAVs. UAV 400 can include sensors 402 configured to measure speed 404, direction 406, altitude 408, date/time/location 410, and/or wind data 412. In some embodiments, wind data 412 is measured by a separate sensor. In some embodiments, wind data 412 is derived from speed 404, direction 406, and altitude 408.

Data from sensors 402 can be monitored by flight log 414. Flight log 414 can store a planned route 416, a real route 418 (e.g., the route as measured during flight), a ground speed 420, an air speed 422, a wind speed 424, and an altitude 426. In some embodiments, wind speed 424 is derived from ground speed 420 and air speed 422. Flight log data 414 can be collected by flight tracking agent 428 and provided to UAV analysis server 446 (e.g., FAA database 448 and/or flight log database 450).

UAV 400 can further include user controls 430. User controls 430 include flight control commands 432 for operating the UAV 400, flight plans 434 for routing the UAV 400, and flight control parameters 436 for developing flight plans 434. Flight control parameters 436 include at least a first location 438 (e.g., a start location), a second location 440 (e.g., an end location), a speed 442, and an altitude 444.

UAV 400 can be permanently, semi-permanently, or intermittently connected to UAV analysis server 446 by a physical or virtual network 470. UAV analysis server 446 can include a FAA database 448 storing basic flight log information for UAV flights, a flight log database 450 storing additional flight log information (e.g., video data, streaming data, etc.), a wind pattern analyzer 452 for analyzing flight log data in FAA database 448 and/or flight log database 450, a wind data manager 454 for managing data analyzed by wind pattern analyzer 452, and a wind database 456 for storing the analyzed wind data collected from the flight log data.

UAV analysis server 446 can be communicatively coupled to wind forecasting system 458 via network 470. Wind forecasting system 458 can be configured to predict wind characteristics. Wind forecasting system 458 can include weather data 460 (e.g., historical and/or forecast weather data) and wind pattern engine 462. Wind pattern engine 462 can predict wind characteristics for an urban microclimate based on weather data 460 and wind database 456.

Extended weather event service 464 is also connected to network 470 and includes stream analytics 466 and video analytics 468. Stream analytics 466 provides real-time data from UAV 400 to UAV analysis server 446 and wind forecasting system 458 to improve forecasting and routing. Video analytics 468 provides supplemental information from UAV 400 to UAV analysis server 446 and wind forecasting system 458. For example, video analytics 468 can provide other information not readily derived from flight logs 414 and/or weather data 460 such as, for example, identification of weather events (e.g., funnel clouds, tornadoes, etc.), traffic (e.g., congestion, accidents, etc.), obstacles (e.g., tree limbs, construction, etc.), and other data which may be helpful to safely, efficiently, expeditiously, and reliably route aerial vehicles in an urban microclimate.

FIG. 4 is intended to represent the major components of another example network according to embodiments of the present disclosure. In some embodiments, however, individual components can have greater or lesser complexity than shown in FIG. 4, and components other than, or in addition to those shown in FIG. 4 can be present. Furthermore, in some embodiments, various components illustrated in FIG. 4 can have greater, lesser, or different functionality than shown in FIG. 4.

Figure 5:
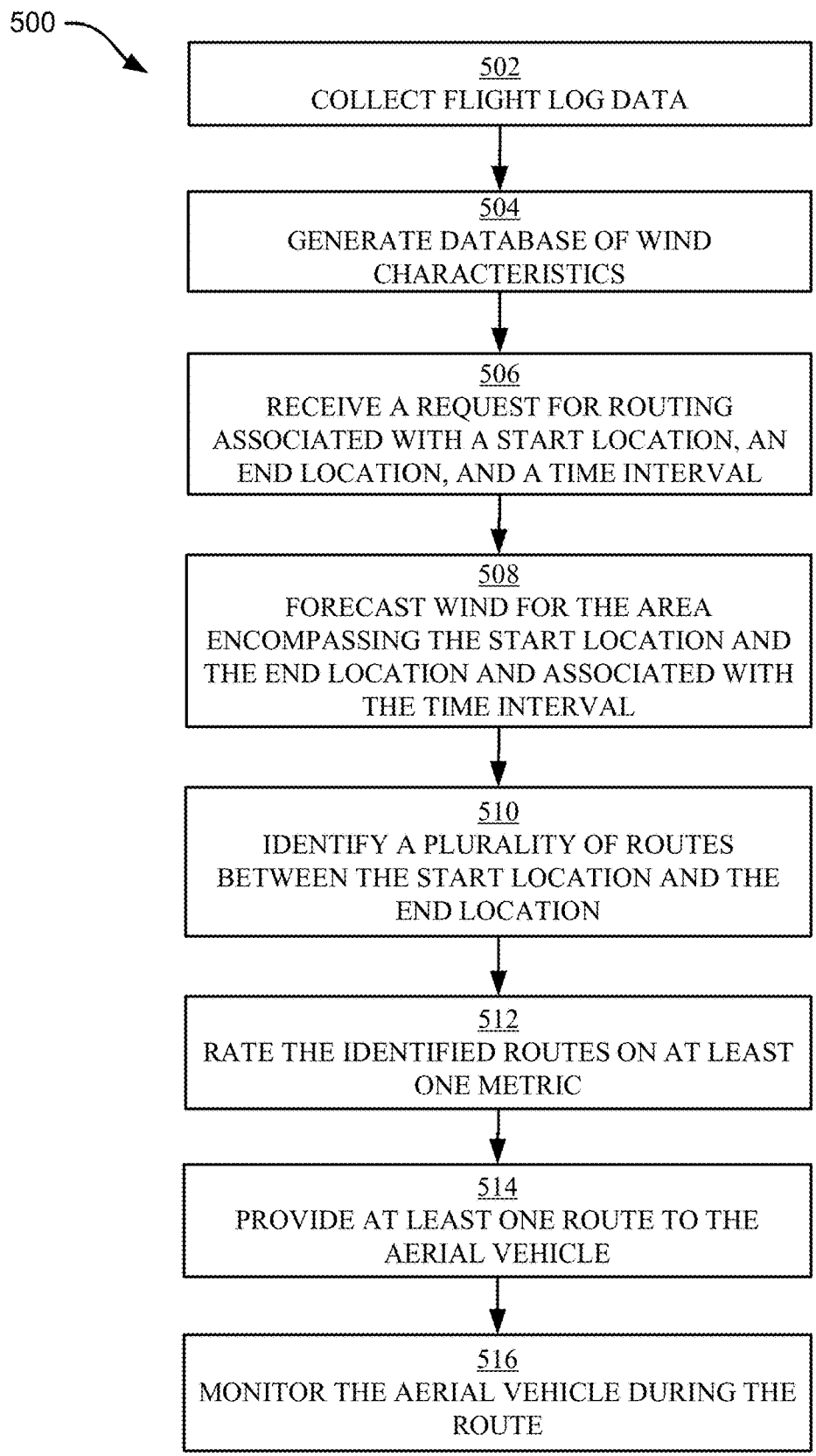
FIG. 5 illustrates a flowchart of an example method for collecting, characterizing, and applying wind characteristic data in an urban microclimate in accordance with some embodiments of the present disclosure.

Referring now to FIG. 5, illustrated is a flowchart of an example method for collecting, characterizing, and applying wind characteristics data in an urban microclimate in accordance with some embodiments of the present disclosure. The method 500 can be performed by one or more processors, a flight management system (e.g., flight management system 324 of FIG. 3), a portion of FIG. 4, or a different configuration of hardware. For clarity, the method 500 will hereafter be described as being performed by a flight management system, however, aspects of the present disclosure can likewise be implemented by alternative configurations of hardware and/or software.

In operation 502, the flight management system can collect flight log data from one or more aerial vehicles operating in an urban microclimate (e.g., aerial vehicles 302, 310 of FIG. 3, and/or UAV 400 of FIG. 4). The flight log data can be collected from one or more databases (e.g., flight log database 320 of FIG. 3 and/or FAA database 448, flight log database 450 of FIG. 4) and/or streamed in real time from one or more aerial vehicles.

In operation 504, the flight management system can generate a database of wind characteristics (e.g., wind database 326 of FIG. 3 and/or wind database 456 of FIG. 4) based on the flight log data and weather data. In some embodiments, operation 504 comprises calculating wind characteristics (e.g., wind speeds, wind gusts, wind directions, wind variability, wind turbulence, etc.) from the collected flight log data. In some embodiments, operation 504 further includes learning associations between wind characteristics and weather conditions. Weather conditions can be retrieved from a weather database (e.g., weather database 322 of FIG. 3 and/or weather data 460 of FIG. 4). Weather conditions can include, but are not limited to, temperature, humidity, pressure, solar angle of incidence, weather anomalies (e.g., hurricanes, tornados, earthquakes, etc.), precipitation, and/or other weather conditions. Operation 504 is discussed in more detail hereinafter with respect to FIG. 6.

In operation 506, the flight management system can receive a request for routing an aerial vehicle. The request can include a start location in the urban microclimate, an end location in the urban microclimate, and a time interval. In some embodiments, the request further includes additional parameters, such as an efficiency parameter, a safety parameter, a timeliness parameter, a reliability parameter, and/or different parameters. For example, an efficiency parameter may be to use a minimum amount of energy, or an amount of energy below a threshold. A safety parameter may be to ensure there is an emergency landing site within 100 yards of the route at all points along the route. A timeliness parameter may be a shortest possible flight time, or for the aerial vehicle to arrive at the end location by a certain time. A reliability parameter may require a forecast wind turbulence along the route to have a confidence rating above a threshold (e.g., greater than 75%).

In operation 508, the flight management system can forecast wind characteristics for the urban microclimate based on the data generated in operation 504 and the anticipated weather conditions associated with the time interval in the request received in operation 506. In some embodiments, operation 508 can be performed by wind forecasting system 328 of FIG. 3 and/or wind forecasting system 458 of FIG. 4. For example, the request may be to leave a start location at 4:00 PM and arrive at an end location before 5:00 PM. The flight management system may retrieve a weather forecast for 4:00 PM-5:00 PM. The weather forecast may be 65° Fahrenheit (F), a solar angle of incidence of 22.59°, and a barometric pressure of 30.1 in-Hg (inches mercury), and clear conditions. The flight management system may retrieve flight log information associated with the urban microclimate for the time interval 4:00 PM-5:00 PM, the temperature 60° F.-70° F., the solar angle of incidence 22°-23°, and the barometric pressure 29.9 in-Hg-30.3 in-Hg. The flight management system can use the retrieved wind characteristic data to forecast wind characteristics for the urban microclimate during the route using any number of machine learning algorithms.

Although not shown, operation 508 can execute any number of machine learning algorithms that may be useful to forecasting wind characteristics based on the data collected in operations 502-506 such as, but not limited to, decision tree learning, association rule learning, artificial neural networks, deep learning, inductive logic programming, support vector machines, clustering, Bayesian networks, reinforcement learning, representation learning, similarity/metric training, sparse dictionary learning, genetic algorithms, rule-based learning, and/or other machine learning techniques.

For example, the flight management system, in operation 508, can be configured to perform machine learning using one or more of the following example techniques: K-nearest neighbor (KNN), learning vector quantization (LVQ), self-organizing map (SOM), logistic regression, ordinary least squares regression (OLSR), linear regression, stepwise regression, multivariate adaptive regression spline (MARS), ridge regression, least absolute shrinkage and selection operator (LASSO), elastic net, least-angle regression (LARS), probabilistic classifier, naïve Bayes classifier, binary classifier, linear classifier, hierarchical classifier, canonical correlation analysis (CCA), factor analysis, independent component analysis (ICA), linear discriminant analysis (LDA), multidimensional scaling (MDS), non-negative metric factorization (NMF), partial least squares regression (PLSR), principal component analysis (PCA), principal component regression (PCR), Sammon mapping, t-distributed stochastic neighbor embedding (t-SNE), bootstrap aggregating, ensemble averaging, gradient boosted decision tree (GBRT), gradient boosting machine (GBM), inductive bias algorithms, Q-learning, state-action-reward-state-action (SARSA), temporal difference (TD) learning, apriori algorithms, equivalence class transformation (ECLAT) algorithms, Gaussian process regression, gene expression programming, group method of data handling (GMDH), inductive logic programming, instance-based learning, logistic model trees, information fuzzy networks (IFN), hidden Markov models, Gaussian naïve Bayes, multinomial naïve Bayes, averaged one-dependence estimators (AODE), Bayesian network (BN), classification and regression tree (CART), chi-squared automatic interaction detection (CHAID), expectation-maximization algorithm, feed-forward neural networks, logic learning machine, self-organizing map, single-linkage clustering, fuzzy clustering, hierarchical clustering, Boltzmann machines, convolutional neural networks, recurrent neural networks, hierarchical temporal memory (HTM), and/or other machine learning techniques.

In operation 510, the flight management system can identify a plurality of routes between the start location and the end location. The routes can comprise numerous waypoints, each waypoint associated with a longitude, a latitude, and an altitude. The routes can further include information related to speeds, accelerations, decelerations, and/or other information.

In operation 512, the flight management system can rate identified routes according to one or more metrics such as, but not limited to, efficiency, safety, and speed. Operation 512 is described in more detail hereinafter with respect to FIG. 7.

In operation 514, the flight management system can provide at least one route to the aerial vehicle in response to the request. The at least one route can be provided to the aerial vehicle with sufficient detail such that the aerial vehicle can automate flight according to the route. The route can include, but is not limited to, way points, speeds, trajectories, accelerations, decelerations, turns, altitudes, and other information useful for routing an aerial vehicle.

In operation 516, the flight management system can monitor the aerial vehicle during the route. For example, the flight management system can receive flight log data from the aerial vehicle while the aerial vehicle is traveling along the route. In some embodiments, the flight management system modifies the route during flight according to the data retrieved from the aerial vehicle. Operation 516 is discussed in more detail with respect to FIG. 8.

In some embodiments, any or all of operations 512-516 can be performed by aerial route management system 330 of FIG. 3.

FIG. 5 is intended to represent the major operations of an example method for collecting, characterizing, and apply wind characteristics in an urban microclimate according to embodiments of the present disclosure. In some embodiments, however, individual operations can have greater or lesser complexity than shown in FIG. 5, and operations other than, or in addition to those shown in FIG. 5 can be present. Furthermore, in some embodiments, various operations illustrated in FIG. 5 can have greater, lesser, or different functionality than shown in FIG. 5.

Figure 6:
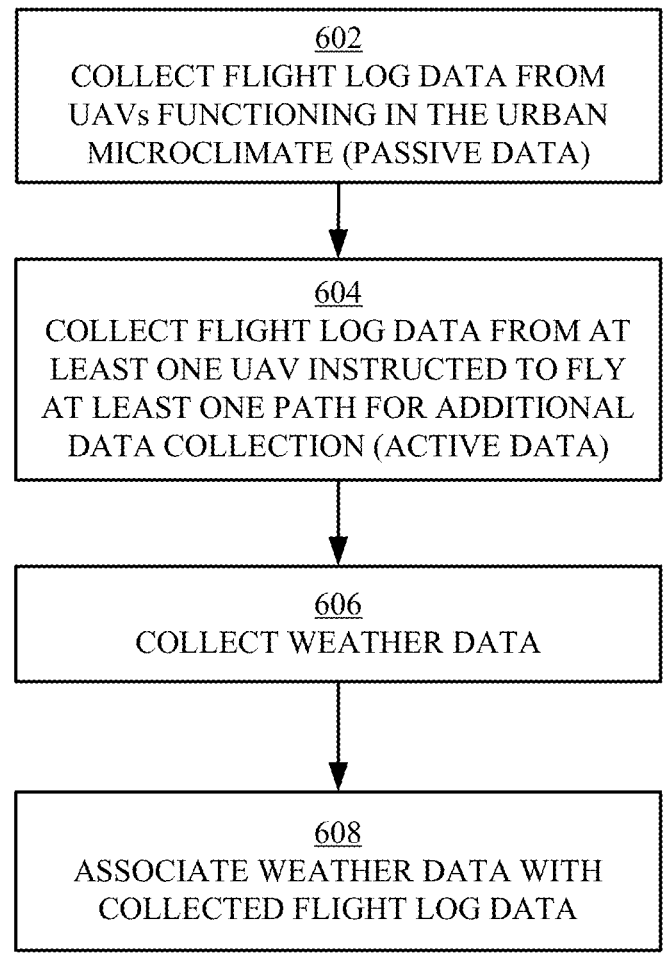
FIG. 6 illustrates a flowchart of an example method for collecting wind characteristic data based on flight log data and weather data in accordance with some embodiments of the present disclosure.

Referring now to FIG. 6, illustrated is a flowchart of an example method for generating a wind characteristics database in accordance with some embodiments of the present disclosure. The method 600 can be performed by one or more processors, a flight management system (e.g., flight management system 324 of FIG. 3), a server (e.g., wind database 326 of FIG. 3 or UAV analysis server 446 of FIG. 4), or a different configuration of hardware. For clarity, the method 300 will hereafter be described as being performed by a flight management system, however, aspects of the present disclosure can likewise be implemented by alternative configurations of hardware and/or software. In some embodiments, the method 600 is a sub-method of operation 504 of FIG. 5.

In operation 602, the flight management system can collect flight log data from a network of UAVs functioning in the urban microclimate. In some embodiments, the data collected in operation 602 is collected from a database such as, but not limited to, a database managed by the FAA and storing UAV flight log data. In some embodiments, the data collected in operation 602 is referred to as passive data because the collected data is collected incidentally to another purpose of the flight rather than for the purpose of collecting flight log data (e.g., the purpose of the flight may be for enjoyment, such as by a hobbyist, or the purpose of the flight may be for delivery, such as by a commercial entity, or the purpose of the flight may be for traffic monitoring, such as by a government entity).

In operation 604, the flight management system can collect flight log data from at least one UAV instructed to fly at least one path for the purpose of collecting flight log data. In some embodiments, the flight log data collected in operation 604 is referred to as active data because the primary purpose of the flight is to collect flight log data. Operation 604 may be used to supplement locations/times/weather conditions with limited passive data. For example, the flight management system may collect active data in operation 604 for the urban microclimate during weather conditions associated with precipitation because fewer hobby UAVs are operated during precipitation. As another example, the flight management system may collect active data in operation 604 for the urban microclimate during night because there is limited passive data collected from UAVs operating during the night.

In operation 606, the flight management system can collect weather data from a weather database (e.g., weather database 322 of FIG. 3 and/or weather data 460 of FIG. 4).

In operation 608, the flight management system can associate the weather data with the collected flight log data. For example, the flight management system can associate weather data for a first time interval with flight log data collected during the first time interval. The flight management system can then derive relationships between weather data and flight log data. For example, the flight management system may associate a range of wind speeds with a certain barometric pressure reading based on flight log data exhibiting the range of wind speeds and associated with weather data having the certain barometric pressure reading. The flight management system can use any number of machine learning algorithms in developing such associations (e.g., any of the machine learning algorithms discussed with respect to operation 508 of FIG. 5).

FIG. 6 is intended to represent the major operations of an example flowchart for generating a wind characteristics database according to embodiments of the present disclosure. In some embodiments, however, individual operations can have greater or lesser complexity than shown in FIG. 6, and operations other than, or in addition to those shown in FIG. 6 can be present. Furthermore, in some embodiments, various operations illustrated in FIG. 6 can have greater, lesser, or different functionality than shown in FIG. 6.

Figure 7:
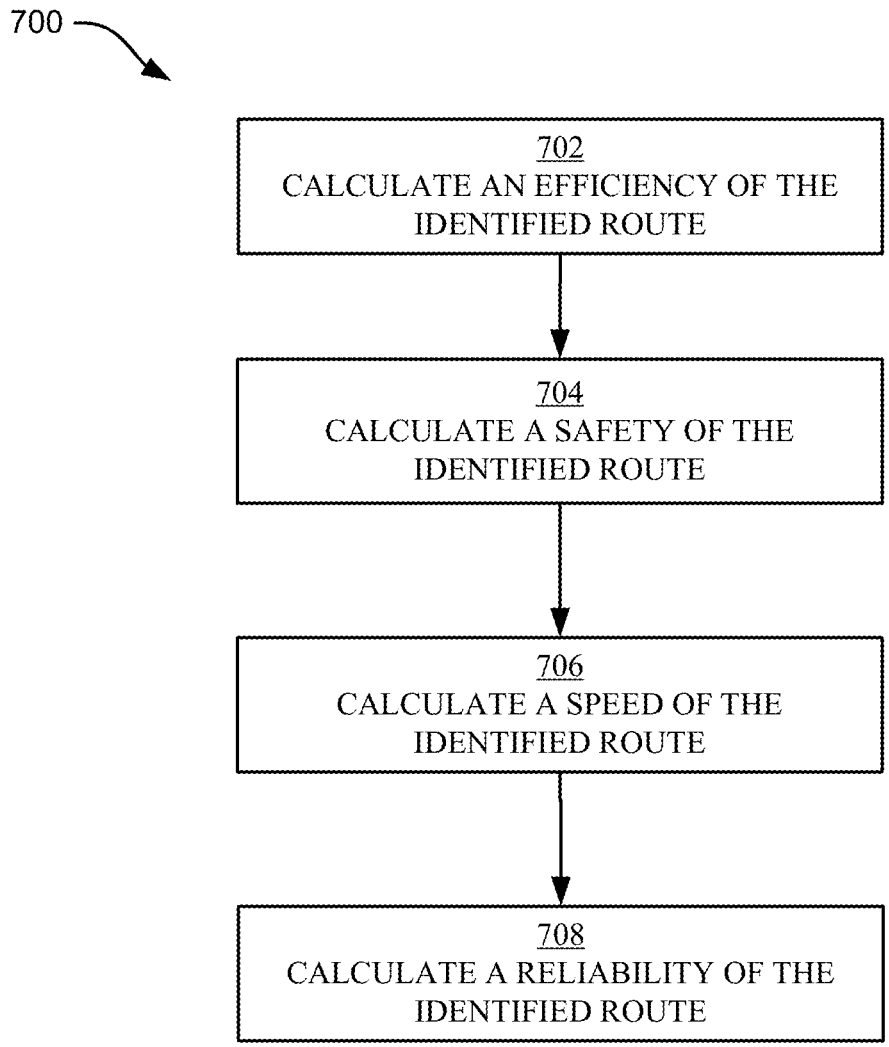
FIG. 7 illustrates a flowchart of an example method for rating various flight plans in accordance with some embodiments of the present disclosure.

Referring now to FIG. 7, illustrated is a flowchart of an example method for rating identified flight routes in accordance with some embodiments of the present disclosure. The method 700 can be performed by one or more processors, a flight management system (e.g., flight management system 324 of FIG. 3), an aerial route management system (e.g., aerial route management system 330 of FIG. 3), a portion of FIG. 4, or a different configuration of hardware. For clarity, the method 700 will hereafter be described as being performed by a flight management system, however, aspects of the present disclosure can likewise be implemented by alternative configurations of hardware and/or software. In some embodiments, the method 700 is a sub-method of operation 512 of FIG. 5.

In operation 702, the flight management system can calculate an efficiency of the identified route. Efficiency can be, but is not limited to, a ratio of the route length to the estimated range of the aerial vehicle when operating under predetermined conditions along the route length, miles per gallon fuel, miles per kilowatt hour battery life, estimated battery life remaining at the end of the route (as a percentage of a full battery, or as an estimated flight time remaining), a cost (e.g., based on power usage, fuel consumption, etc.), or a different measure of efficiency.

In operation 704, the flight management system can calculate a safety of the identified route. A safety rating can be based on numerous factors such as, but not limited to, a congestion associated with the route (e.g., a number of UAVs typically flying the route), a number of obstacles along the route (e.g., trees, power lines, street lights, construction, etc.), an estimated likelihood of sufficient power to reach the destination safely (e.g., a safety factor), a recovery factor (e.g., easier to recover a malfunctioning UAV over a field rather than over a body of water), and/or other factors.

In operation 706, the flight management system can calculate a speed associated with the route. The speed can be conveyed as an amount of time from the start location to the end location and/or as an estimated time of arrival at the end location.

In operation 708, the flight management system can calculate a reliability of the identified route. The reliability can be based on, among other factors, the quality of information being used to generate the identified route. For example, an identified route associated with a time interval for which there is no flight log data or limited flight log data can have a lower reliability than a route during a time interval with sufficient flight log data. As another example, an identified route having portions where flight log data exhibits a high level of variability can be considered less reliable than a route where flight log data exhibits limited variability. As yet another example, severe weather forecasts can decrease reliabilities of routes. For example, if the route is in a portion of a tornado warning, the reliability can be decreased relative to a route not associated with any forecast weather warnings.

The operations of the method 700 can be used separately or together according to various embodiments of the present disclosure. For example, each of the calculations can be associated with a threshold, and the flight management system can attempt to identify a route which satisfies all the thresholds (e.g., a route having remaining battery life above a first threshold (e.g., an efficiency of 10% remaining battery life after completing the route), a duration of flight below a second threshold (e.g., a speed of less than 35 minutes), a safety above a third threshold (e.g., a drone is recoverable at more than 90% of all locations along the route), and a reliability above a fourth threshold (e.g., greater than 70% confidence in forecasted wind characteristics along all portions of the route). In alternative embodiments, the flight management system may choose the optimal flight route according to any one of the above measurements while disregarding the other measurements (e.g., a fastest route regardless of efficiency). In yet other embodiments, the flight management system can select an identified route as the route which optimizes any one of the aforementioned characteristics while also satisfying a threshold in each of the aforementioned characteristics.

FIG. 7 is intended to represent the major operations of an example flowchart for rating identified flight routes according to embodiments of the present disclosure. In some embodiments, however, individual operations can have greater or lesser complexity than shown in FIG. 7, and operations other than, or in addition to those shown in FIG. 7 can be present. Furthermore, in some embodiments, various operations illustrated in FIG. 7 can have greater, lesser, or different functionality than shown in FIG. 7.

Figure 8:
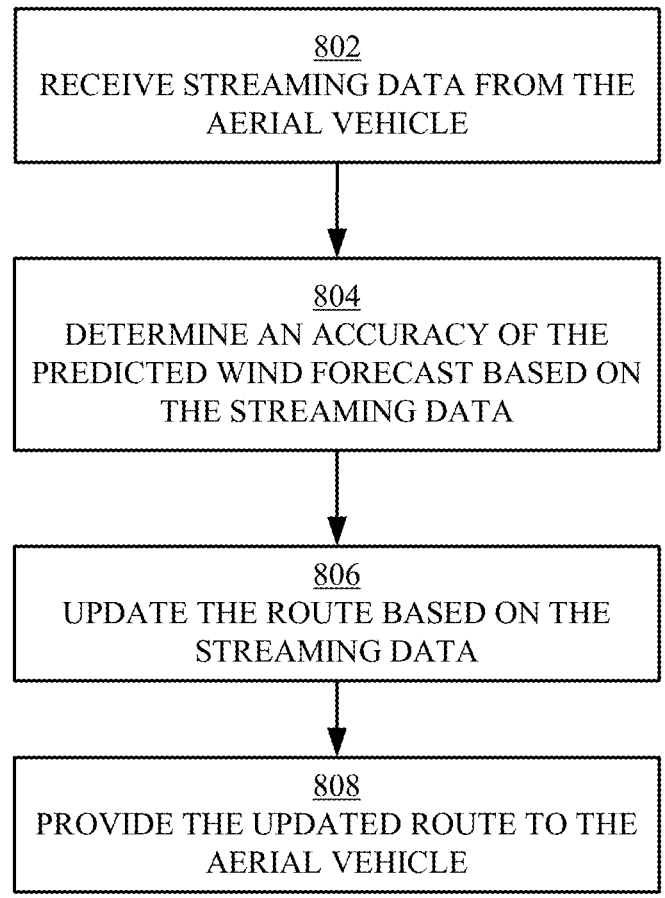
FIG. 8 illustrates a flowchart of an example method for monitoring an aerial flight plan in accordance with some embodiments of the present disclosure.

Referring now to FIG. 8, illustrated is a flowchart of an example method for monitoring an aerial vehicle during flight in accordance with some embodiments of the present disclosure. The method 800 can be performed by one or more processors, a flight management system (e.g., flight management system 324 of FIG. 3), an aerial route management system (e.g., aerial route management system 330 of FIG. 3), a portion of FIG. 4, or a different configuration of hardware. For clarity, the method 800 will hereafter be described as being performed by a flight management system, however, aspects of the present disclosure can likewise be implemented by alternative configurations of hardware and software. In some embodiments, the method 800 is a sub-method of operation 516 of FIG. 5.

In operation 802, the flight management system can receive streaming data from an aerial vehicle. Streaming data can include, but is not limited to, video data, audio data, speed data (e.g., atmospheric speed, ground speed, perturbation speed, etc.), location data (e.g., position, orientation, altitude), wind data (e.g., speed, direction, variability), and/or other data.

In operation 804, the flight management system can determine an accuracy of the streaming data compared to the predicted wind forecast (e.g., the forecast wind characteristics generated in operation 508 of FIG. 5). In some embodiments, the flight management system determines a difference between the forecast wind characteristics and the wind characteristics derived from the streaming data in operation 802.

In operation 806, the flight management system can update the route based on the streaming data received in operation 802 and the accuracy determined in operation 804. For example, the flight management system can update the route in accordance with the wind characteristics measured in the streaming data relative to the estimated wind characteristics used to develop the route. As another example, the flight management system can update the route based on obstacles identified by video data streamed to the flight management system in operation 802.

In operation 808, the flight management system can provide the updated route to the aerial vehicle. In some embodiments, the flight management system causes the aerial vehicle to modify direction, speed, and/or altitude in accordance with the updated route.

FIG. 8 is intended to represent the major components of an example flowchart for monitoring an aerial vehicle according to embodiments of the present disclosure. In some embodiments, however, individual operations can have greater or lesser complexity than shown in FIG. 8, and operations other than, or in addition to those shown in FIG. 8 can be present. Furthermore, in some embodiments, various operations illustrated in FIG. 8 can have greater, lesser, or different functionality than shown in FIG. 8.

Figure 9:
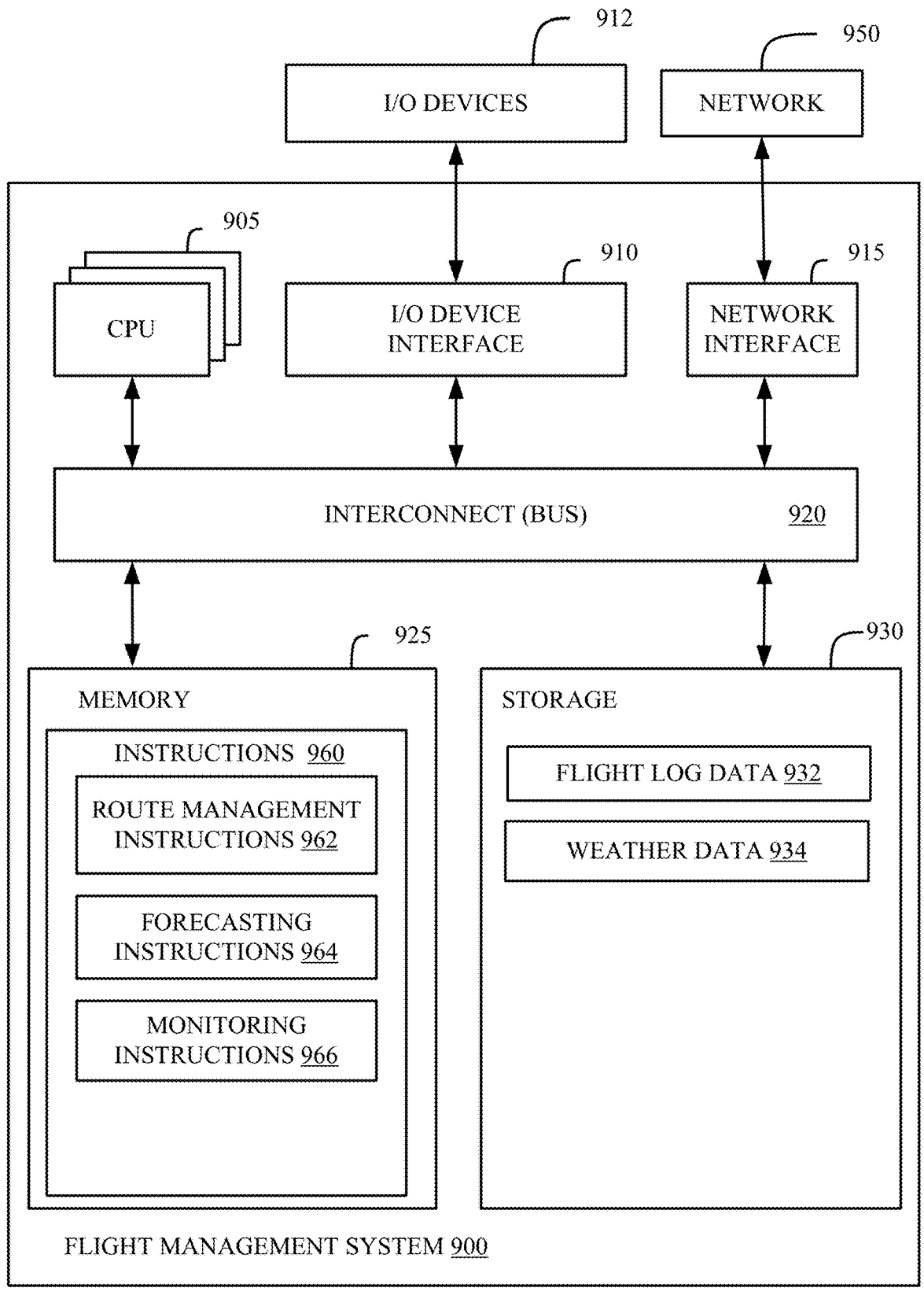
FIG. 9 illustrates a block diagram of an example flight management system in accordance with some embodiments of the present disclosure.

FIG. 9 illustrates a block diagram of an example flight management system 900 in accordance with some embodiments of the present disclosure. In some embodiments, flight management system 900 is consistent with flight management system 324 of FIG. 3. In various embodiments, flight management system 900 performs any of the methods described in FIGS. 5-8. In some embodiments, flight management system 900 provides instructions for one or more of the methods described in FIGS. 5-8 to a client machine such that the client machine executes the method, or a portion of the method, based on the instructions provided by the flight management system 900 (e.g., software as a service (SaaS)).

The flight management system 900 includes a memory 925, storage 930, an interconnect (e.g., BUS) 920, one or more CPUs 905 (also referred to as processors 905 herein), an I/O device interface 910, I/O devices 912, and a network interface 915.

Each CPU 905 retrieves and executes programming instructions stored in the memory 925 or storage 930. The interconnect 920 is used to move data, such as programming instructions, between the CPUs 905, I/O device interface 910, storage 930, network interface 915, and memory 925. The interconnect 920 can be implemented using one or more busses. The CPUs 905 can be a single CPU, multiple CPUs, or a single CPU having multiple processing cores in various embodiments. In some embodiments, a CPU 905 can be a digital signal processor (DSP). In some embodiments, CPU 905 includes one or more 3D integrated circuits (3DICs) (e.g., 3D wafer-level packaging (3DWLP), 3D interposer based integration, 3D stacked ICs (3D-SICs), monolithic 3D ICs, 3D heterogeneous integration, 3D system in package (3DSiP), and/or package on package (PoP) CPU configurations). Memory 925 is generally included to be representative of a random access memory (e.g., static random access memory (SRAM), dynamic random access memory (DRAM), or Flash). The storage 930 is generally included to be representative of a non-volatile memory, such as a hard disk drive, solid state device (SSD), removable memory cards, optical storage, or flash memory devices. In an alternative embodiment, the storage 930 can be replaced by storage area-network (SAN) devices, the cloud, or other devices connected to the flight management system 900 via the I/O devices interface 910 or a network 950 via the network interface 915.

In some embodiments, the memory 925 stores instructions 960 and the storage 930 stores flight log data 932 and weather data 934. However, in various embodiments, the instructions 960, the flight log data 932, and the weather data 934 are stored partially in memory 925 and partially in storage 930, or they are stored entirely in memory 925 or entirely in storage 930, or they are accessed over a network 950 via the network interface 915.

Flight log data 932 can be consistent with flight log database 320 of FIG. 3, FAA database 448 of FIG. 4, and/or flight log database 450 of FIG. 4. Flight log data 932 can store, for example, historical flight information from a network of UAVs operating in an urban microclimate.

Weather data 934 can be consistent with weather database 322 of FIG. 3 and/or weather data 460 of FIG. 4. Weather data 934 can store weather data (e.g., temperature, barometric pressure, wind characteristics, solar angle of incidence, humidity, precipitation, and/or other weather characteristics).

The instructions 960 are processor executable instructions including route management instructions 962, forecasting instructions 964, and monitoring instructions 966. Route management instructions 962 can be executed by flight management system 900 to generate a flight path for an aerial vehicle based on forecasted wind turbulence for the urban microclimate. Route management instructions 962 can be consistent with aerial route management system 330 of FIG. 3 and perform aspects of the method 500 of FIG. 5 and/or the method 700 of FIG. 7.

Forecasting instructions 964 can be executed by flight management system 900 to forecast turbulence in the urban microclimate for a selected time interval based on turbulence data inferred from flight log data 932 and associated with weather data 934. In some embodiments, forecasting instructions 964 can be configured to implement aspects of the method 500 of FIG. 5 and/or the method 600 of FIG. 6. In some embodiments, forecasting instructions 964 are consistent with wind forecasting system 328 of FIG. 3 and/or wind forecasting system 458 of FIG. 4.

Monitoring instructions 966 can be executed by flight management system 900 to monitor an aerial vehicle while traversing a route (e.g., the route determined using route management instructions 962). In some embodiments, monitoring instructions 966 can implement aspects of the method 500 of FIG. 5 and/or the method 800 of FIG. 8.

In various embodiments, the I/O devices 912 include an interface capable of presenting information and receiving input (e.g., user interface 332 of FIG. 3). For example, I/O devices 912 can present information to a user (e.g., one or more proposed routes for an aerial vehicle) interacting with flight management system 900 and receive input from a user (e.g., a selected route, flight log data 932, a request for routing including at least a start location, an end location, and a time interval, or other input).

Flight management system 900 is connected to the network 950 via the network interface 915. In some embodiments, network 950 is consistent with network 350 of FIG. 3.

FIG. 9 is intended to represent the major components of an example flight management system 900 according to embodiments of the present disclosure. In some embodiments, however, individual components can have greater or lesser complexity than shown in FIG. 9, and components other than, or in addition to those shown in FIG. 9 can be present. Furthermore, in some embodiments, various components illustrated in FIG. 9 can have greater, lesser, or different functionality than shown in FIG. 9.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 10:
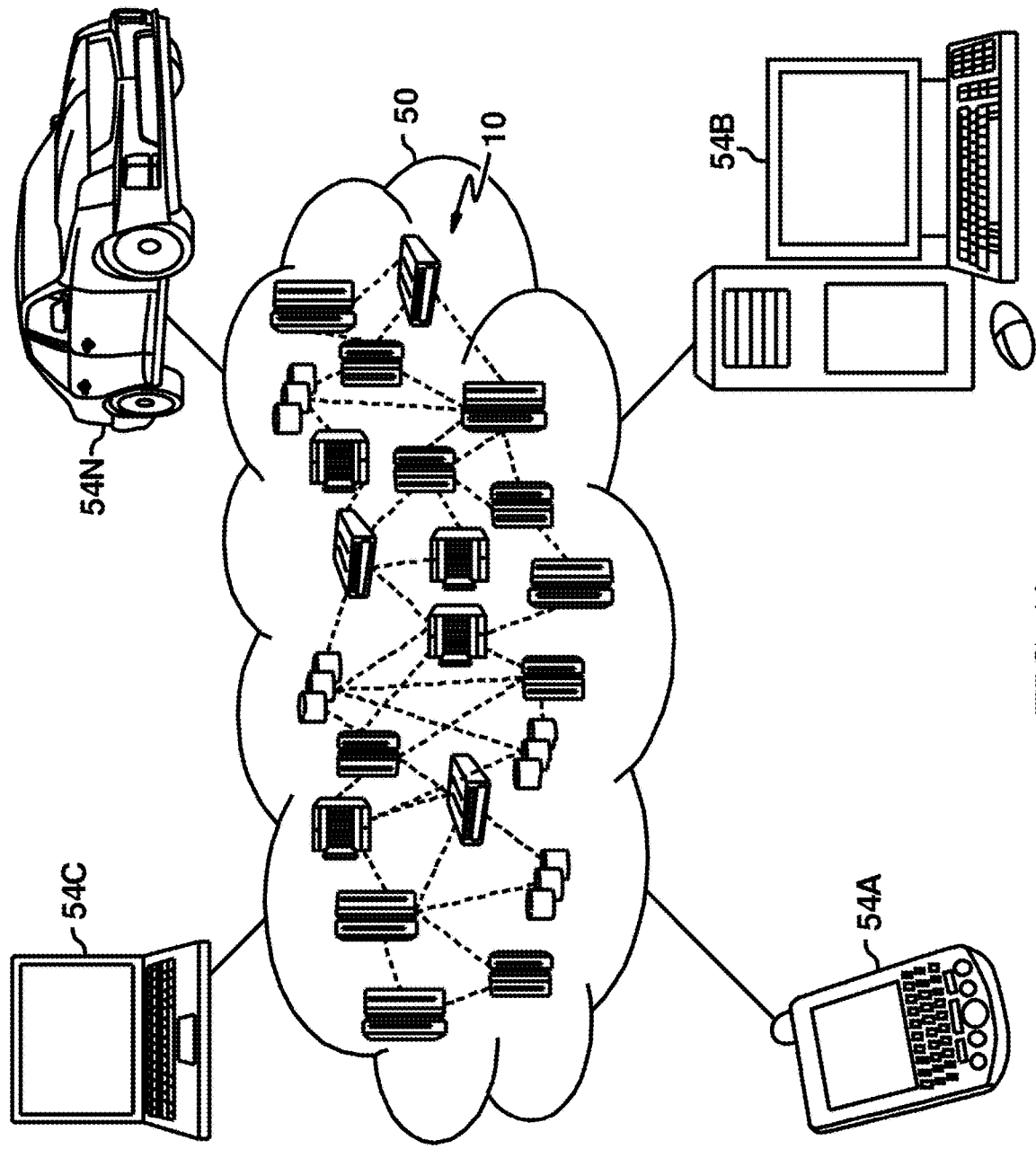
FIG. 10 depicts a cloud computing environment according to some embodiments of the present disclosure.

Referring now to FIG. 10, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 10 are intended to be illustrative only and that computing nodes 10 and cloud computing environment 50 can communicate with any type of computerized device over any type of network and/or network addressable connection (e.g., using a web browser).

Figure 11:
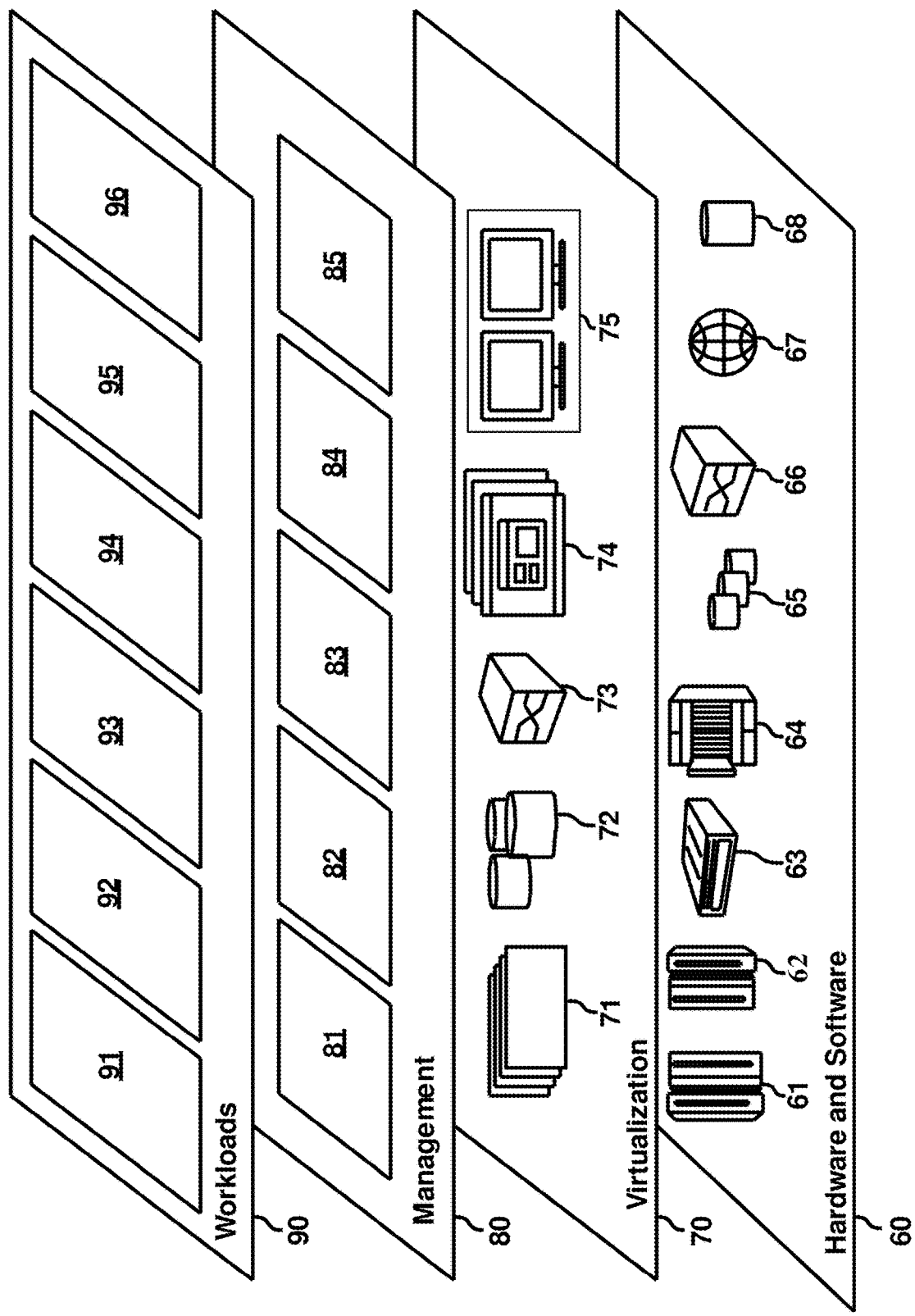
FIG. 11 depicts abstraction model layers according to some embodiments of the present disclosure.

Referring now to FIG. 11, a set of functional abstraction layers provided by cloud computing environment 50 (FIG. 10) is shown. It should be understood in advance that the components, layers, and functions shown in FIG. 11 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and wind forecasting and/or flight planning 96.

Embodiments of the present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or subset of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

While it is understood that the process software (e.g., any of the instructions stored in instructions 960 of FIG. 9 and/or any software configured to perform any subset of the methods described with respect to FIGS. 5-8) may be deployed by manually loading it directly in the client, server, and proxy computers via loading a storage medium such as a CD, DVD, etc., the process software may also be automatically or semi-automatically deployed into a computer system by sending the process software to a central server or a group of central servers. The process software is then downloaded into the client computers that will execute the process software. Alternatively, the process software is sent directly to the client system via e-mail. The process software is then either detached to a directory or loaded into a directory by executing a set of program instructions that detaches the process software into a directory. Another alternative is to send the process software directly to a directory on the client computer hard drive. When there are proxy servers, the process will select the proxy server code, determine on which computers to place the proxy servers' code, transmit the proxy server code, and then install the proxy server code on the proxy computer. The process software will be transmitted to the proxy server, and then it will be stored on the proxy server.

Embodiments of the present invention may also be delivered as part of a service engagement with a client corporation, nonprofit organization, government entity, internal organizational structure, or the like. These embodiments may include configuring a computer system to perform, and deploying software, hardware, and web services that implement, some or all of the methods described herein. These embodiments may also include analyzing the client's operations, creating recommendations responsive to the analysis, building systems that implement subsets of the recommendations, integrating the systems into existing processes and infrastructure, metering use of the systems, allocating expenses to users of the systems, and billing, invoicing, or otherwise receiving payment for use of the systems.

What is claimed is:

1. A computer-implemented method comprising:
   collecting flight log data from a plurality of aerial vehicles and associated with an urban microclimate, wherein the flight log data comprises speed data, orientation data, and location data;
   generating a wind characteristics database for the urban microclimate based on the flight log data associated with the urban microclimate, wherein the wind characteristics database comprises a plurality of wind speed data for respective locations in the urban microclimate based on the speed data, the orientation data, and the location data;
   receiving a request for routing an aerial vehicle in the urban microclimate, the request including a start location, an end location, and a first time interval;
   generating, based on data stored in the wind characteristics database, forecasted wind conditions for the urban microclimate during the first time interval, wherein the forecasted wind conditions include wind speed, wind direction, wind variability, turbulence, and gusting characteristics for portions of the urban microclimate;
   generating, using the forecasted wind conditions, a plurality of routes between the start location and the end location in the urban microclimate; and
   providing a first route of the plurality of routes to the aerial vehicle.

2. The method according to claim 1, wherein collecting flight log data further comprises:
   collecting passive flight log data, wherein the passive flight log data is collected from aerial vehicles operated for a purpose other than collecting flight log data; and
   collecting active flight log data, wherein the active flight log data is collected from respective aerial vehicles operating in order to collect flight log data.

3. The method according to claim 2, wherein the passive flight log data is collected from a database managed by the Federal Aviation Administration (FAA).

4. The method according to claim 1, wherein the flight log data collected from the plurality of aerial vehicles is further associated with respective dates and times, and wherein generating the wind characteristics database further comprises:
   collecting weather data for the urban microclimate, the weather data associated with respective dates and times; and
   associating the weather data with respective portions of the flight log data according to the respective dates and times.

5. The method according to claim 4, wherein generating forecasted wind conditions further comprises:
   receiving forecasted weather conditions for the first time interval, wherein the forecasted weather conditions include temperature, solar angle of incidence, barometric pressure, humidity, and precipitation;
   predicting the forecasted wind conditions in the urban microclimate using cognitive computing, wherein the forecasted wind conditions are based on the forecasted weather conditions, the weather data for the urban microclimate, and the flight log data; and
   generating a confidence interval associated with the forecasted wind conditions.

6. The method according to claim 1, wherein generating a plurality of routes further comprises:

calculating a respective efficiency for respective routes of the plurality of routes, wherein the first route is associated with a first efficiency, wherein the first efficiency comprises an energy efficiency above an efficiency threshold.

7. The method according to claim 6, wherein the first route is longer than a shortest route of the plurality of routes.

8. The method according to claim 1, wherein generating a plurality of routes further comprises:
calculating a respective time for respective routes of the plurality of routes, wherein the first route is associated with a first time, wherein the first time comprises an amount of time below a time threshold.

9. The method according to claim 1, wherein generating a plurality of routes further comprises:
calculating a respective safety for respective routes of the plurality of routes, wherein the first route is associated with a first safety above a safety threshold, wherein the first safety is based on a recoverability of the aerial vehicle at one or more portions of the first route.

10. The method according to claim 1, wherein generating a plurality of routes further comprises:
calculating a respective reliability for respective routes of the plurality of routes, wherein the first route is associated with a first reliability above a reliability threshold, wherein the first reliability is associated with a confidence interval, wherein the confidence interval is based on a quantity of data and a variability of data used to generate the forecasted wind conditions.

11. The method according to claim 1, further comprising:
receiving streaming flight log data from the aerial vehicle during the first route;
generating updated forecasted wind conditions based on the streaming flight log data from the aerial vehicle during the first route;
generating a modified first route based on the updated forecasted wind conditions; and
providing the modified first route to the aerial vehicle.

12. The method according to claim 11, wherein receiving flight log data from the aerial vehicle further comprises receiving streaming flight log data from a plurality of aerial vehicles operating in the urban microclimate, and wherein updating the forecasted wind conditions is further based on the streaming flight log data from the plurality of aerial vehicles operating in the urban microclimate.

13. The method according to claim 11, wherein receiving flight log data from the aerial vehicle during the first route further comprises receiving video data from the aerial vehicle during the first route, and wherein modifying the first route is further based on the video data received from the aerial vehicle during the first route.

14. The method according to claim 1, wherein the request further includes an aerial vehicle type, a payload, a size, and a range.

15. The method of claim 1, wherein the urban microclimate comprises an area of less than or equal to one square mile and having a population density of greater than 10,000 people per square mile.

16. A system comprising:
a wind database storing wind data for an urban microclimate, wherein the wind data is derived from flight log data collected from a plurality of unmanned aerial vehicles (UAVs) operating in the urban microclimate;
a wind forecasting system comprising a processor and a memory and communicatively coupled to the wind database, wherein the wind forecasting system is configured to generate forecasted wind conditions for the urban microclimate for a first time interval, wherein the forecasted wind conditions are based on the wind database and a weather forecast for the urban microclimate during the first time interval, wherein the forecasted wind conditions include wind speed, wind direction, wind variability, turbulence, and gusting characteristics for portions of the urban microclimate, and wherein the weather forecast includes temperature, solar angle of incidence, barometric pressure, humidity, and precipitation; and
an aerial route management system comprising a processor and a memory and communicatively coupled to the wind forecasting system and a first UAV, wherein the aerial route management system plans a first route for the first UAV from a start location to an end location in the urban microclimate, wherein the first route is based on the forecasted wind conditions.

17. The system according to claim 16, wherein the aerial route management system is further configured to:
calculate a first efficiency for the first route, wherein the first efficiency comprises an energy efficiency above an efficiency threshold;
calculate a first time for the first route, wherein the first time comprises an amount of time below a time threshold;
calculate a first safety rating for the first route, wherein the first safety rating is above a safety threshold; and
calculate a first reliability for the first route, wherein the first reliability is above a reliability threshold, wherein the first reliability is associated with a confidence interval, wherein the confidence interval is based on a quantity of data and a variability of data used to generate the forecasted wind conditions.

18. The system according to claim 16, wherein the aerial route management system is further configured to:
receive streaming flight log data from the first UAV during the first route;
receive additional streaming flight log data from a plurality of UAVs operating in the urban microclimate;
generate updated forecasted wind conditions based on the streaming flight log data from the first UAV during the first route and further based on the additional streaming flight log data from the plurality of UAVs operating in the urban microclimate;
generate a modified first route based on the updated forecasted wind conditions; and
provide the modified first route to the first UAV.

19. A computer program product comprising one or more computer readable storage media having program instructions collectively embodied therewith, wherein the one or more computer readable storage is media are not transitory signals per se, the program instructions executable by one or more processors to cause the one or more processors to perform a method comprising:
collecting flight log data from a plurality of aerial vehicles and associated with an urban microclimate, wherein the flight log data comprises at least speed data, orientation data, and location data;
generating a wind characteristics database for the urban microclimate based on the flight log data associated with the urban microclimate, wherein the wind characteristics database comprises a plurality of wind speed data for respective locations in the urban microclimate based on the speed data, the orientation data, and the location data;

receiving a request for routing an aerial vehicle in the urban microclimate, the request including at least a start location, an end location, and a first time interval;

generating, based on data stored in the wind characteristics database, forecasted wind conditions for the urban microclimate during the first time interval, wherein the forecasted wind conditions include wind speed, wind direction, wind variability, turbulence, and gusting characteristics for portions of the urban microclimate;

generating, using the forecasted wind conditions, a plurality of routes between the start location and the end location in the urban microclimate; and providing a first route of the plurality of routes to the aerial vehicle.

20. The computer program product according to claim 19, wherein flight log data collected from the plurality of aerial vehicles is further associated with respective dates and times, and wherein generating a wind characteristics database further comprises:

collecting weather data for the urban microclimate, the weather data associated with respective dates and times; and associating the weather data with respective portions of flight log data according to the respective dates and times;

wherein generating forecasted wind conditions further comprises:

receiving forecasted weather conditions for the first time interval, wherein the forecasted weather conditions include temperature, solar angle of incidence, barometric pressure, humidity, and precipitation;

predicting the forecasted wind conditions in the urban microclimate using cognitive computing, wherein the forecasted wind conditions are based on the forecasted weather conditions, the weather data for the urban microclimate, and the flight log data; and generating a confidence interval associated with the forecasted wind conditions.

* * * * *